United States Patent
Ondeck et al.

(10) Patent No.: US 9,666,194 B2
(45) Date of Patent: May 30, 2017

(54) RECORDING AND ENTERTAINMENT SYSTEM

(71) Applicant: Flashbox Media, LLC, McMurray, PA (US)

(72) Inventors: Raymond R. Ondeck, McMurray, PA (US); Gary Cozen, Pittsburgh, PA (US); Christopher L. Miller, Mercer, PA (US); Guy Williams, Eighty Four, PA (US); Michael Mandel, Brookline, MA (US)

(73) Assignee: FLASHBOX MEDIA, LLC, McMurray, PA (US)

( * ) Notice: Subject to any disclaimer, the term of this patent is extended or adjusted under 35 U.S.C. 154(b) by 0 days.

(21) Appl. No.: 14/298,915

(22) Filed: Jun. 7, 2014

(65) Prior Publication Data

US 2015/0142429 A1 May 21, 2015

Related U.S. Application Data

(60) Provisional application No. 61/832,301, filed on Jun. 7, 2013.

(51) Int. Cl.
*G10L 19/00* (2013.01)
*G10L 21/0208* (2013.01)
(Continued)

(52) U.S. Cl.
CPC .............. *G10L 19/00* (2013.01); *G03B 17/48* (2013.01); *G03B 31/00* (2013.01); *G10H 1/368* (2013.01);
(Continued)

(58) Field of Classification Search
CPC ........ G10H 2210/066; G10H 2220/015; G06F 3/0482; G06F 3/04842; G10L 15/22; G10L 21/06; G06N 3/008
(Continued)

(56) References Cited

U.S. PATENT DOCUMENTS 5,271,669 A  12/1993  Pearlson
5,481,509 A  1/1996  Knowles
(Continued)

FOREIGN PATENT DOCUMENTS

JP       2001-229297       8/2001
WO    WO-2005/038772 A2   4/2005
WO    WO-2009/002195 A2  12/2008

*Primary Examiner* — Michael Colucci
(74) *Attorney, Agent, or Firm* — Dinsmore & Shohl LLP

(57) ABSTRACT

A recording and entertainment system is provided. A mobile kiosk is capable or being outfitted with one or more cameras for capturing visual content, an audio recording system, a display device, a computer to control recording, storing, processing, and playing the captured visual and audio content. The captured video and audio are then processed and edited to produce remembrance products in various forms, including videos. Karaoke function is provided by a means for recognizing songs being performed and displaying lyrics on the display. Camera tilt, noise suppression, noise cancelation, voice control of the computer, a battery pack to free kiosk for movement, means for internet communication of the visual and audio content, means for confirming that objects of the visual content capture are within the field of view, robotic control of the kiosk, and interactive gaming means are additional features that can be utilized with the system.

13 Claims, 20 Drawing Sheets

(51) Int. Cl.
*G03B 17/48* (2006.01)
*G10H 1/36* (2006.01)
*G11B 27/031* (2006.01)
*H04N 21/222* (2011.01)
*H04N 21/81* (2011.01)
*G03B 31/00* (2006.01)

(52) U.S. Cl.
CPC ........ *G10L 21/0208* (2013.01); *G11B 27/031* (2013.01); *H04N 21/2223* (2013.01); *H04N 21/8113* (2013.01); *G10H 2220/455* (2013.01)

(58) Field of Classification Search
USPC ..... 704/231, 276, 275; 84/610, 609; 705/59, 705/26.1, 14.49
See application file for complete search history.

(56) References Cited

U.S. PATENT DOCUMENTS

| | | | |
|---|---|---|---|
| 6,025,553 A * | 2/2000 | Lee ................. | G10H 1/365 84/602 |
| 6,340,978 B1 | 1/2002 | Mindrum | |
| 6,369,908 B1 | 4/2002 | Frey et al. | |
| 7,053,915 B1 * | 5/2006 | Jung ................. | G10H 1/368 345/629 |
| 7,624,344 B2 | 11/2009 | Mindrum et al. | |
| 7,657,835 B2 | 2/2010 | Mindrum et al. | |
| 7,942,461 B2 | 5/2011 | Cohen et al. | |
| 8,089,564 B2 | 1/2012 | Ryckman | |
| 8,116,081 B2 | 2/2012 | Crick, Jr. | |
| 8,144,257 B2 | 3/2012 | Ryckman | |
| 8,169,548 B2 | 5/2012 | Ryckman | |
| 8,433,431 B1 * | 4/2013 | Master ................. | G10H 1/0008 700/94 |
| 8,555,174 B2 | 10/2013 | Mindrum et al. | |
| 9,303,982 B1 * | 4/2016 | Ivanchenko ......... | G01B 11/22 |
| 2001/0020837 A1 * | 9/2001 | Yamashita ............ | B25J 13/003 318/567 |
| 2001/0029583 A1 | 10/2001 | Palatov et al. | |
| 2002/0199198 A1 | 12/2002 | Stonedahl | |
| 2003/0147539 A1 * | 8/2003 | Elko .................. | H04R 3/005 381/92 |
| 2004/0175152 A1 * | 9/2004 | Chen ................. | G10H 1/361 386/231 |
| 2005/0013594 A1 | 1/2005 | Eagan | |
| 2005/0097613 A1 | 5/2005 | Ulate et al. | |
| 2005/0100311 A1 | 5/2005 | Hohenacker | |
| 2005/0137942 A1 * | 6/2005 | LaFleur ............. | G07G 1/0018 705/26.1 |
| 2006/0141435 A1 * | 6/2006 | Chiang .................. | H04N 5/64 434/307 A |
| 2006/0228683 A1 * | 10/2006 | Jianping ............... | G10H 1/366 434/307 A |
| 2007/0247979 A1 * | 10/2007 | Brillon .............. | G06Q 30/0603 369/30.06 |
| 2008/0103976 A1 * | 5/2008 | Read ................. | G06F 21/10 705/59 |
| 2008/0172243 A1 * | 7/2008 | Kelly ................ | G06Q 30/0251 705/14.49 |
| 2008/0184870 A1 * | 8/2008 | Toivola .................. | G10H 1/365 84/610 |
| 2008/0198271 A1 | 8/2008 | Malki | |
| 2008/0282871 A1 * | 11/2008 | Chen ................. | G10H 1/363 84/610 |
| 2008/0299530 A1 * | 12/2008 | Veitch ................ | G10H 1/32 434/307 A |
| 2009/0165634 A1 * | 7/2009 | Mahowald ............ | G10H 1/368 84/610 |
| 2010/0247081 A1 | 9/2010 | Victoria Pons | |
| 2011/0226872 A1 * | 9/2011 | Foppe, Jr. ............. | A47F 3/001 239/289 |
| 2012/0107785 A1 * | 5/2012 | Pan ..................... | G09B 5/06 434/307 A |
| 2012/0158531 A1 * | 6/2012 | Dion ................. | G06Q 10/10 705/26.1 |
| 2012/0162436 A1 | 6/2012 | Cordell et al. | |
| 2012/0166965 A1 * | 6/2012 | Nathan ................ | G06Q 20/123 715/748 |
| 2012/0191461 A1 * | 7/2012 | Lin ..................... | G06F 3/165 704/275 |
| 2012/0241464 A1 * | 9/2012 | Adams ................. | G07F 7/0609 221/120 |
| 2012/0265758 A1 | 10/2012 | Han et al. | |
| 2013/0070093 A1 * | 3/2013 | Rivera ................ | G11B 27/002 348/143 |
| 2014/0000440 A1 * | 1/2014 | Georges ................ | G10H 7/00 84/609 |
| 2014/0028454 A1 | 1/2014 | Covannon et al. | |
| 2014/0129235 A1 * | 5/2014 | Suvanto ................. | G10L 15/22 704/276 |
| 2014/0331246 A1 * | 11/2014 | Schneiderman . | H04N 21/44008 725/19 |
| 2015/0080072 A1 * | 3/2015 | Kim ..................... | A63F 13/213 463/7 |

* cited by examiner

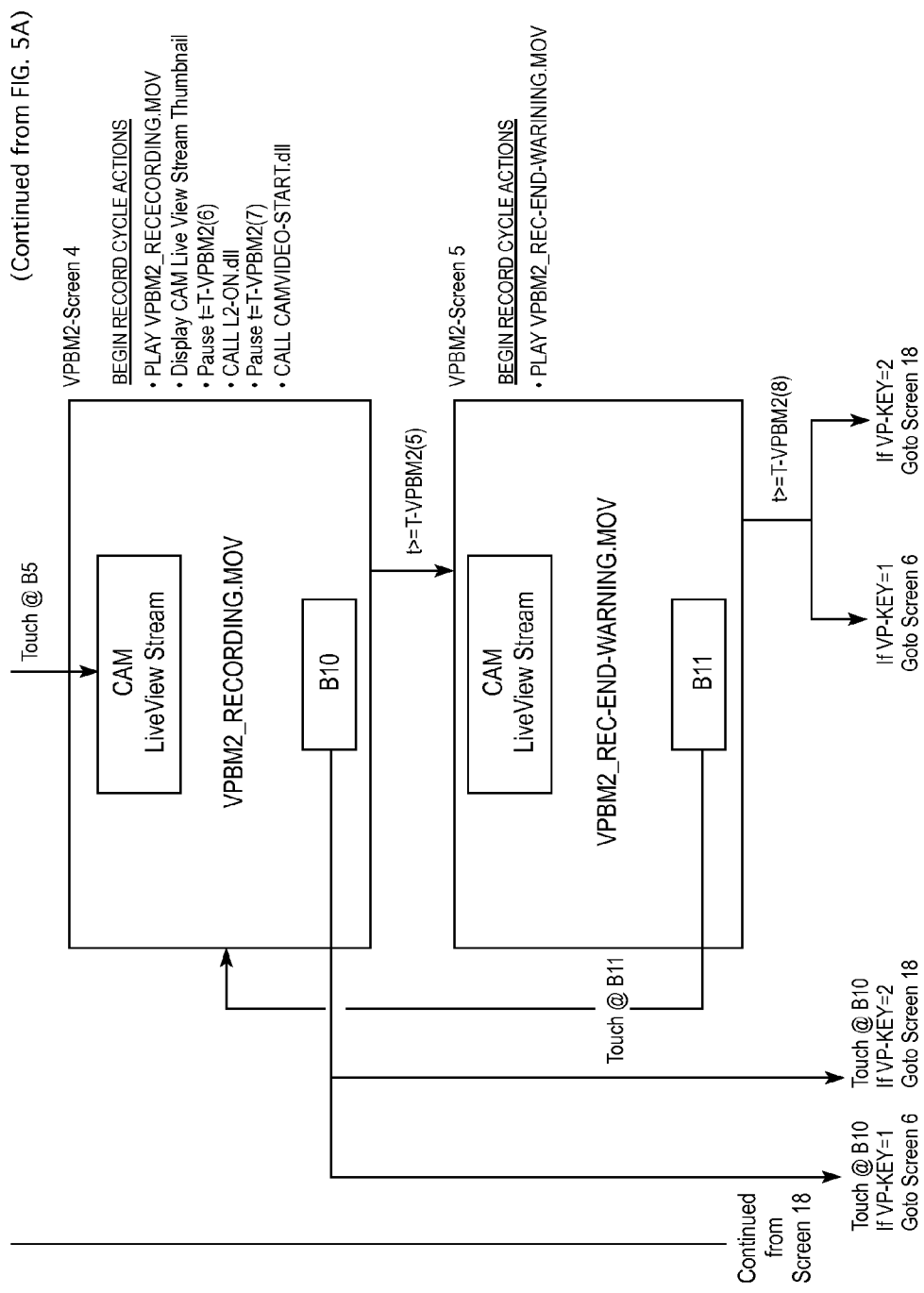

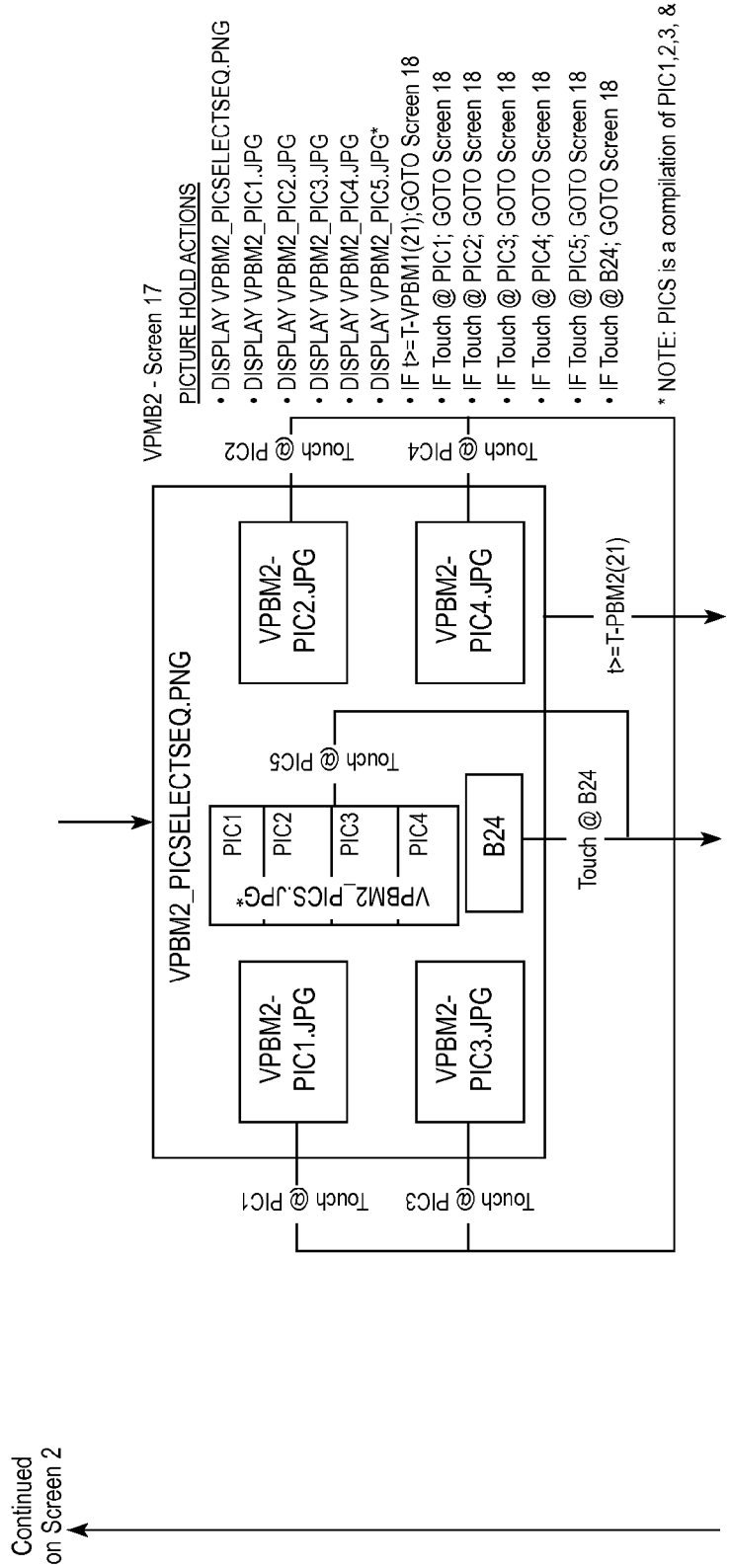

| BUTTONS/OVERLAYS/DISPLAYS | SIZE (WxH) | PIVOT POINT | HORIZONTAL | VERTICAL |
|---|---|---|---|---|
| B1 | 3x1 | CL | 3 from R | 1 from Bot |
| B2 | 3x1 | CL | 3 from R | 1 from Bot |
| B3 | 1/2x1/2 | CL | 1/2 from L | 1/2 from Top |
| B4* | 1/2x1/2 | CL | 1/2 from L | 3-1/2 from Top |
| B5 | 3x1 | CL | Centered L to R | 1 from Bot |
| B6 | 1-1/8x1 | CL | 1/1/8 from R | 3/4 from Top |
| B7 | 1-1/8x1 | CL | 1/1/8 from R | 3/4 from Bot |
| B8* | 1-1/8x1 | CL | 1/1/8 from L | 3/4 from Top |
| B9* | 1-1/8x1 | CL | 1/1/8 from L | 3/4 from Bot |
| B10 | 3x1 | CL | Centered L to R | 1 from Bot |
| B11 | 3x1 | CL | Centered L to R | 3/4 from Bot |
| B12 | 1-1/8x1-1/8 | CL | 1/2 from R | Centered from Top to Bot |
| B13 | 3x1 | CL | 1/2 from L | 1-1/4 from Top |
| B14 | 3x1 | CL | 1/2 from L | 2 from Top |
| B15 | 3x1 | CL | 1/2 from L | 2-3/4 from Top |
| B16 | 1/2x1/2 | CL | 2-1/2 from L | 3/4 from Bot |
| B17 | 1/2x1/2 | CL | 2-1/2 from R | 3/4 from Bot |
| B18 | 1/2x1/2 | CL | Centered L to R | 3/4 from Top |
| B19 | 1-1/8x1 | CL | 1/1/8 from R | 3/4 from Bot |
| B20 | 1-1/8x1 | CL | 1/1/8 from R | 3/4 from Top |
| B21* | 1-1/8x1 | CL | 1/1/8 from L | 3/4 from Top |
| B22* | 1-1/8x1 | CL | 1/1/8 from L | 3/4 from Bot |
| B23 | 1-1/8x1-1/8 | CL | 3/4 from R | Centered from Top to Bot |
| B24 | 3x1 | CL | Centered L to R | 1 from Bot |
| B25* | 1x1 | CL | 1/2 from L | 3/4 from Bot |
| B26* | 1x1 | CL | 2 from L | 3/4 from Bot |
| OL1 | 5x2 | CL | Centered L to R | 1-1/2 from Top |
| OL2 | 3x3 | CL | 1-3/4 from L | Centered Top To Bot |
| VPBM2-DESKTOP-OL1 | 10.75x6 | CL | Centered L to R | Centered Top to Bot |
| VPBM2-DESKTOP-OL2 | 10.75x6 | CL | Centered L to R | Centered Top to Bot |
| VPBM2-DESKTOP-OL3 | 10.75x6 | CL | Centered L to R | Centered Top to Bot |
| CAM LiveView Stream Thumbnail | 1.78x 1(16.9) | | | |
| VPBM2-PIC1.JPG | 3x2 | CL | Centered L to R | 3/4 from Top |
| VPBM2-PIC2.JPG | 3x2 | CL | 1.75 from L | 4 from Bot |
| VPBM2-PIC3.JPG | 3x2 | CL | 1.75 from R | 4 from Bot |
| VPBM2-PIC4.JPG | 3x2 | CL | 1.75 from R | 1.5 from Bot |
| VPBM2-PIC5.JPG | 1.13x 3 | CL | 1.75 from R | 1.5 from Bot |
| | | CL | Centered L to R | 3.5 from Bot |

FIG. 5J (Continued from FIG. 5I)

| Timers | Seconds | Purpose | Comment |
|---|---|---|---|
| T-VPBM2(1) | 600.00 | Elapsed timer limit | Jump to Demo |
| T-VPBM2(2) | 2.00 | Elapsed timer limit | Prevent spurious PROXSEN input |
| T-VPBM2(3) | 30.00 | Elapsed timer limit | Taking too long to frame |
| T-VPBM2(4) | 2.00 | Elapsed timer limit | Prevent spurious PROXSEN input |
| T-VPBM2(5) | 300.00 | Elapsed timer limit | Recording time limit |
| T-VPBM2(6) | 1.00 | Static Recording sequencer | Time between actions |
| T-VPBM2(7) | 1.00 | Static Recording sequencer | Time between actions |
| T-VPBM2(8) | 5.00 | Elapsed timer limit | Taking too long to decide |
| T-VPBM2(9) | 30.00 | Elapsed timer limit | Taking too long to frame |
| T-VPBM2(10) | 2.00 | Elapsed timer limit | Elapsed timer limit |
| T-VPBM2(11) | 1.00 | Static Recording sequencer | Prevent spurious PROXSEN input |
| T-VPBM2(12) | 1.00 | Static Recording sequencer | Time between actions |
| T-VPBM2(13) | 1.00 | Static Recording sequencer | Time between actions |
| T-VPBM2(14) | 1.00 | Static Recording sequencer | Time between actions |
| T-VPBM2(15) | 1.00 | Static Recording sequencer | Time between actions |
| T-VPBM2(16) | 1.00 | Static Recording sequencer | Time between actions |
| T-VPBM2(17) | 1.00 | Static Recording sequencer | Time between actions |
| T-VPBM2(18) | 1.00 | Static Recording sequencer | Time between actions |
| T-VPBM2(19) | 1.00 | Static Recording sequencer | Time between actions |
| T-VPBM2(20) | 1.00 | Static Recording sequencer | Time between actions |
| T-VPBM2(21) | 5.00 | Elapsed timer limit | Taking too long to decide |
| T-VPBM2(22) | 5.00 | Static timer | Time Screen is displayed |

FIG. 5K (Continued from FIG. 5J)

RECORDING AND ENTERTAINMENT SYSTEM

CROSS-REFERENCE TO RELATED APPLICATIONS

This application claims priority to U.S. Provisional No. 61/832,301, titled "Mobile Video Recording, Photography, and Entertainment Devices and Production System for Special Events," and filed on Jun. 7, 2013, which is incorporated herein by reference as if set forth in its entirety.

TECHNICAL FIELD

The present invention relates to a system for photographic and video preservation of the memories of the sights and sounds of special events, and the enhancement of the same through the addition of entertainment features and state of the art communications functionality.

BACKGROUND

Photography has been traditionally used to document events in discrete still images. Videography has also become pervasive, not as a replacement to still images, but to augment photography by capturing the sights and sounds of the event as if it were a motion picture. Both are third-person perspectives and neither format has done an adequate job of creating and capturing contemporaneous first-person accounts of the proceedings and actively involving a good portion of the attendees of the event by capturing their messages for the host or guest(s) of honor. When each format is replayed as a discrete and separate element, the viewing experience does not comprehensively capture all the fun and emotions of the event suitable as a permanent remembrance.

The invention described herein advances the art and practice of producing an event video. The systems, products and processes described in U.S. Published Patent Application Nos. U.S. 2005/0013594 A1, U.S. 2002/0199198, and 2012/0265758, and U.S. Pat. No. 6,369,908, are considered as background art.

SUMMARY OF THE INVENTION

The present invention relates to a mobile, multi-functioned kiosk and integrated production system for enhancing and recording a wide variety of events, including social events such as weddings, birthday parties, bar mitzvahs, and other types of events. The system and integral mobile device create an immersive photographic/videographic/entertainment experience that documents an event from several different and novel perspectives. The content produced and collected thereby can be transmitted to an internet based media platform to facilitate remote editing and centralized final assembly/issuance that can ultimately be transmitted to the end-user in various formats. In one embodiment, one or more devices (i.e., kiosks) are brought to the site of the event, in one or more small, easily transported pieces, and simply and rapidly assembled on site. Users are enabled to self-interact with the kiosk(s) through a simple user interface, via touch and/or verbal inputs, to concurrently record video content and produce digital and printed photographs on demand. The kiosk can adjust to record users of various heights in the center of the frame. The kiosk can be equipped with an audio noise cancelation means and voice processing systems to focus recording at the frequency of the human voice and depress/exclude extraneous background noise up to 115 db. The kiosk has one or more on-board cameras and one or more remote cameras which transmit content via an on-board wireless network, which is also connected to the internet. The kiosk(s) can play user-selected pre-recorded karaoke content or produce karaoke lyrics synchronized to prerecorded and/or live music, and capture the user(s) performance in both video and photos. The kiosks can be controlled by the user directly through an integral user interface or remotely by a third party via a mobile device and internet. The kiosk(s) are mobile and may be easily moved from location to location within the event site as a single unit by pushing the unit on rolling base, or they can be moved by means of a remotely controlled robotic base that transports the unit under its own power. The kiosk can be used in a form where it is tethered to the electrical grid, or it can be operated from its on-board self-contained power supply. In another embodiment, one or more kiosks are used at a wedding as entertainment and to capture festivities and guest messages, then the visual content and/or audio content is transmitted via the internet for production of a personal remembrance of the event.

One embodiment of the invention comprises the following elements that, when combined as a whole, advance the art and practice of producing an improved event video.

I. Kiosk architectural elements
II. Kiosk functional/operational elements
III. Processing to create and produce novel event videos The kiosk is mobile and therefore is designed to facilitate ease of transport from one event location to a geographically different event location, and also within the area of one event location to follow the event activities as they evolve through the course of the event. The kiosk typically, but not always, consists of four major parts:

1. Base
2. Support
3. Façade
4. Head

Transporting the mobile kiosk to the event location in pieces of manageable size/weight, each of which can be easily handled by a person of average strength/size, has the advantage of not requiring specialized transport vehicles or dedicated delivery manpower services. An alternative style kiosk has the base, support and head connected to gether, for example by hinges, where a mechanical or pneumatic assist is provide to cause the collapsed components to open into a fully deployed structure, as described in greater detail hereafter. These alternatives allow the event facilitator, if so staffed, to load, transport, and unload the kiosk at the event using a compact vehicle. At the event location, the kiosk is rapidly and easily assembled as the pieces are keyed to fit together and locked in place by hand-tightened fasteners/set-screws or else a pneumatic actuator can cause the connected components to open using mechanical power. The kiosk requires only a source of electrical power, either from the venue electrical grid or from the kiosk on-board power supply. The kiosk and other system components become operational and ready to be used for their intended purposes through the kiosk user interface(s). The assembled, operational kiosk is compact and can require very little floor space ($<2$ ft$^2$) and is mobile. In one embodiment the wheels/casters on the base allows it to be easily pushed/rolled throughout the venue. In another embodiment, it is outfitted with a robotic mobile base that allows the kiosk to move throughout the venue as directed by the event facilitator via a hand-held RF controller or in response to kiosk COMPUTER as commanded via the user interfaces(s).

The kiosk is fully automated, and controlled via user interface software. On user command, it records video and takes photographs. Video and photos can be stored as content for subsequent use in the post production of event videos and related services. Videos can also be viewed real-time with a display within the event via wired or local network connection, or remotely outside of the event via the internet. Through use of an optional printer, photographs can be printed on demand either as a photo-strip or larger format portrait as a favor for attendees. Likewise, photos can be viewed real-time with a display within the event, via wired or local network connection, or remotely outside of the event via the internet. Accompanying recorded audio tracks are processed to emphasize the frequency of human voice and are treated to minimize background noise, permitting the subject's voice to be clearly heard even in a loud sound field. The kiosk can play pre-recorded karaoke music and record subjects singing the lyrics. It can also identify and display karaoke lyrics in sync with prerecorded songs played at the venue by a DJ or songs performed live by a band at the event while concurrently recording subjects singing along to the song.

Event videos produced using the system described herein assembles a multiplicity of content, from a multiplicity of sources, to create a documentary of the event that is stylistically unique and more entertaining than the current best practice in this market/application. The uniqueness of the captured content is enhanced by the ease of use and relatively anonymous environment created by the kiosk, which permits users to lose ordinary inhibitions and display their creativity and innermost feelings. The process may begin by preparing the guests to be in attendance in advance by informing them (by various methods) of the use of the kiosk at the event, providing suggestions for different types of recordings (singing, offering advice, sharing memories, etc.), and soliciting participation to record content and/or take photos. This advance notice often leads to superior content by permitting the guest the time to prepare content. During the event, the event facilitator directs the proceedings and movement of all the various capture devices, and encourages all in attendance to utilize the kiosk to record content and photos. In addition to content generation by the kiosk and all photo/video cameras employed by the event team, a Photo/Video App for mobile devices is available to every participant at the event. The content from all of the individual smart phones/devices at the event can be uploaded to a common cloud-based site and combined with the photos/video recorded by the event attendees on their individual off-line devices (i.e., cameras). All of this content can be used and integrated into the final production of the event video to create a comparatively complete documentation of the event from virtually every possible perspective. The client is provided with the ability to view the content on-line, and annotate individual video clips and photos with names and other unique data, thereby personalizing the finished product and facilitating the retention key of identifiers and making the finished product more meaningful in the future.

BRIEF DESCRIPTION OF THE DRAWINGS

FIGS. 5A-5K is a flow diagram showing the kiosk User Interface Operating System (UIOS) sequence of operations according to one embodiment of the invention.

DETAILED DESCRIPTION

The recording and entertainment system is more fully described with reference to the accompanying drawings, in which some, but not all, of the embodiments of the invention are shown. As will be understood by one skilled in the relevant field, this invention may be embodied in many different forms and should not be construed or limited to the embodiments set forth herein. Rather these embodiments are provided as examples of configurations of the system described herein. Like component numbers refer to like elements throughout.

Kiosk Architectural Design Embodiments

Figure 1:
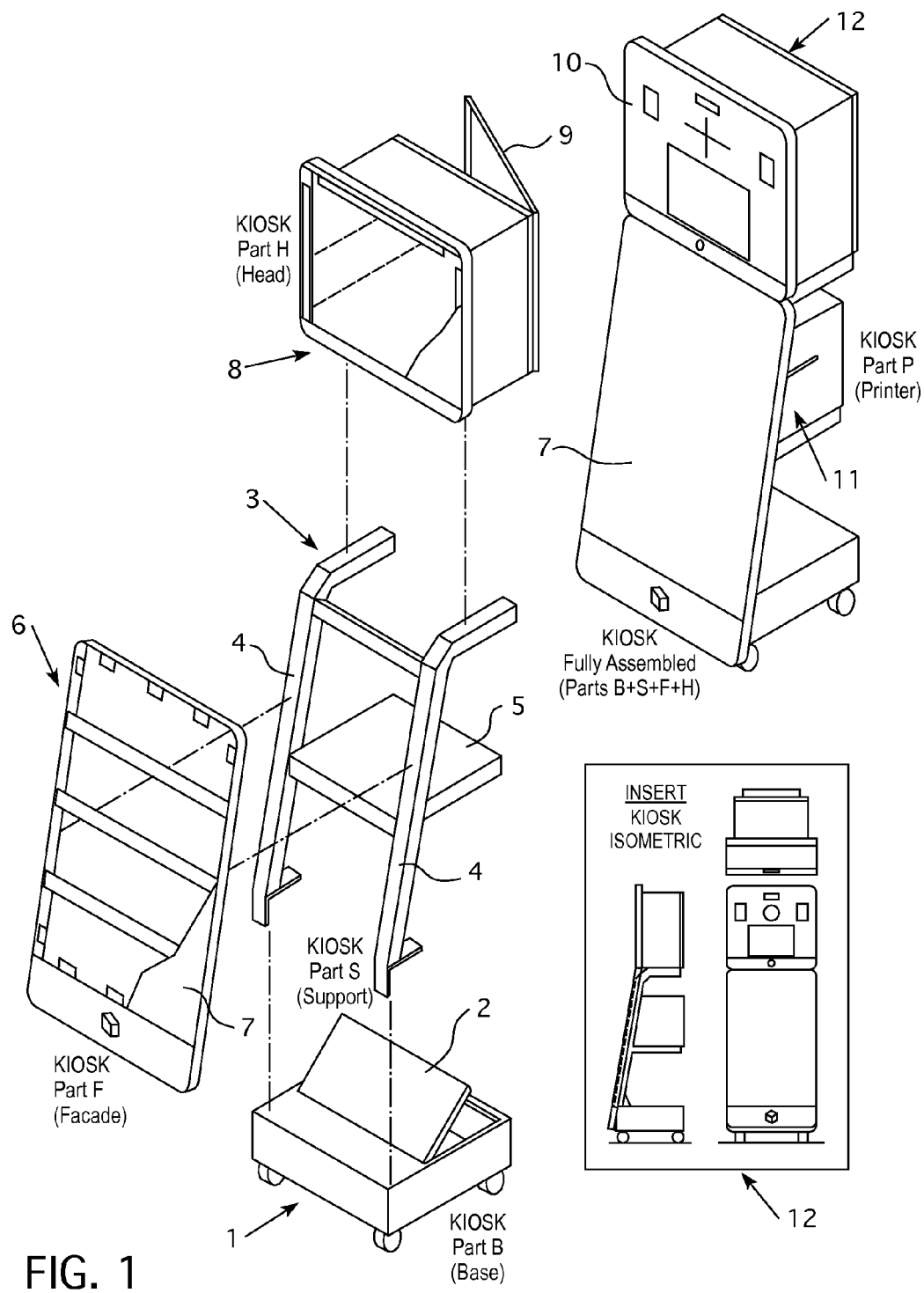
FIG. 1 is a drawing of the kiosk architectural design showing how it is assembled according one embodiment of the invention.

FIG. 1 shows the kiosk architectural design, and how it may assembled according one embodiment of the invention. The kiosk is mobile and its design allows it to be easily transported both from event location to a different event geographical location without special provisions, and to move from location to location within an event to follow the action as it evolves through the course of the event. The kiosk may consist of four major parts with an optional printer: (1) a base, (2) a support, (3) a façade, and (4) a head.

The assembly of the kiosk on-site begins by setting base 1 on the floor. Base 1 outer housing is preferably fabricated of metal, wherein a light weight metal like aluminum is most preferred. Base 1 intentionally designed to accomodating the heaviest/largest component of the kiosk assembly and houses the kiosk power supply. The footprint of the base coupled with its mass, contributes to the overall stability and safety of the kiosk to prevent tipping of the assembly in use. Base 1 is outfitted with a movable door or panel 2, which may be equipped with a lock to prevent unauthorized access, to allow a means of entry to service the power supply components. It is also equipped with mating flanges designed to accept the legs of support 3. Support 3 can be rigid or articulating.

In one embodiment, base 1 may be equipped with wheels/casters (not shown) which allow the event facilitator to easily push and move base 1 (and therefore fully assembled kiosk 12) from location to location. In another embodiment, base 1 may be equipped with a robotic drive unit, such as the Mega Bot Robotic Platform as manufactured by Inspectorbot.com, which allows the event facilitator to robotically control the movement of base 1 (and therefore the fully assembled kiosk 12) using a hand-held radio-frequency controller to easily move it from location to location within a single event. In another embodiment, base 1 with installed robotic platform can be controlled from a smartphone/tablet app. Alternatively, a robotic drive unit can be controlled via the software on kiosk computer 20 in response to inputs from the user interface, a saved preprogrammed routing, or self-navigate around obstacles with input from installed sensors.

Next, a rigid support 3 is attached to base 1. Support 3 is preferably a structural member designed to carry the weight of façade 6, head 8, and printer 11. Legs 4 of the support are keyed such that they slip into a mating flange in base 1. Once in place, two hand-tightened set-knobs (not shown) lock support 3 to base 1. Support 3 is fabricated of any strong, light-weight material, such aluminum. The front face of support 3 is slotted to accept mating connections on façade 6 and head 8. Support 3 may be designed with shelf 5 to hold optional printer 11. Support 3 is designed on a rake such that the mass of carried components is projected downward through the centroid of base 1, contributing to the overall stability and safety of fully assembled kiosk 12, to prevent tipping during in use.

Next, façade 6 is attached to support 3. Façade 6 is an architectural panel designed to cover support 3 and base 1 during use to enhance the appearance of kiosk 12. A rectangular bezel, made of light weight metal like aluminum, is preferred, and holds interchangeable panel 7, which can be of any material, including metal, plastic, glass and fiber-board. The bezel is designed to allow panel 7 to be quickly and easily changed so that it can be customized from event to event. In one embodiment, panel 7 is painted polycarbonate. In another embodiment, panel 7 is made of the same metal and surface treatment as the bezel, thus giving façade 6 a solid appearance. In any case, panel 7 can carry various applied graphics. In a third embodiment, panel 7 can be back lit to enhance its visibility. Panel 7 may have one or more slots in it to allow the discharge of photos directly through it. The rear face of façade 6 has protrusions or pins that align with slots in support 3. When positioned into place, the weight of façade 6 holds it securely to support 3.

Next, head 8 is attached to support 3. Head 8 contains all of the functional/operational components of kiosk 12. A lightweight metal like aluminum is preferred. Head 8 is outfitted with movable door/panel 9 on its rear surface, which can be equipped with a lock to prevent unauthorized access, to allow a means of entry to service the internal components. Interchangeable panel 10 may be attached to the front surface of head 8 to enhance the appearance of kiosk 12. A rectangular bezel, preferably made of a light-weight metal like aluminum, holds panel 10, which can be of any material, including metal, plastic, glass or fiber-board. In one embodiment, panel 10 is a solid transparent surface integral with an applied digitizer, through which the camera(s) and lighting function behind the transparent layer. It can be masked to make the surface opaque and thereby obscure components behind panel 10 from view. In another embodiment, panel 10 may be made from any material, it may be masked, and it may contain slots or other types of cut-outs to permit the functional components to protrude through the surface. The bottom surface of head 8 is equipped with protrusions or pins which align with slots in support 3. Once set in place, two hand-tightened set-knobs (not shown) lock head 8 to support 3.

A printer 11 can be attached to support 3 and held securely with a hand-tightened set-screw. Printer 11 may be contained in a separate enclosure fabricated of metal, preferably made of a lightweight metal like aluminum. Printer 11 may deliver photos through a slot in panel 7 of the façade 3 so that the user may immediately pick them up, or they may be directed to a holding tray for subsequent processing.

Kiosk 12 is made fully operational and ready to use by connecting a power (120 VAC) jumper cable (not shown) between base 1 and head 8. If equipped with optional printer 11, its power cord can also be connected to base 1. Kiosk 12 may be equipped with a universal power supply including backup battery 14 and additional battery storage capacity 15. To recharge kiosk backup battery 14 and additional battery storage 15, the kiosk power cord (not shown) can be connected to a standard 3-prong 120 VAC power outlet in the venue.

Figure 9:
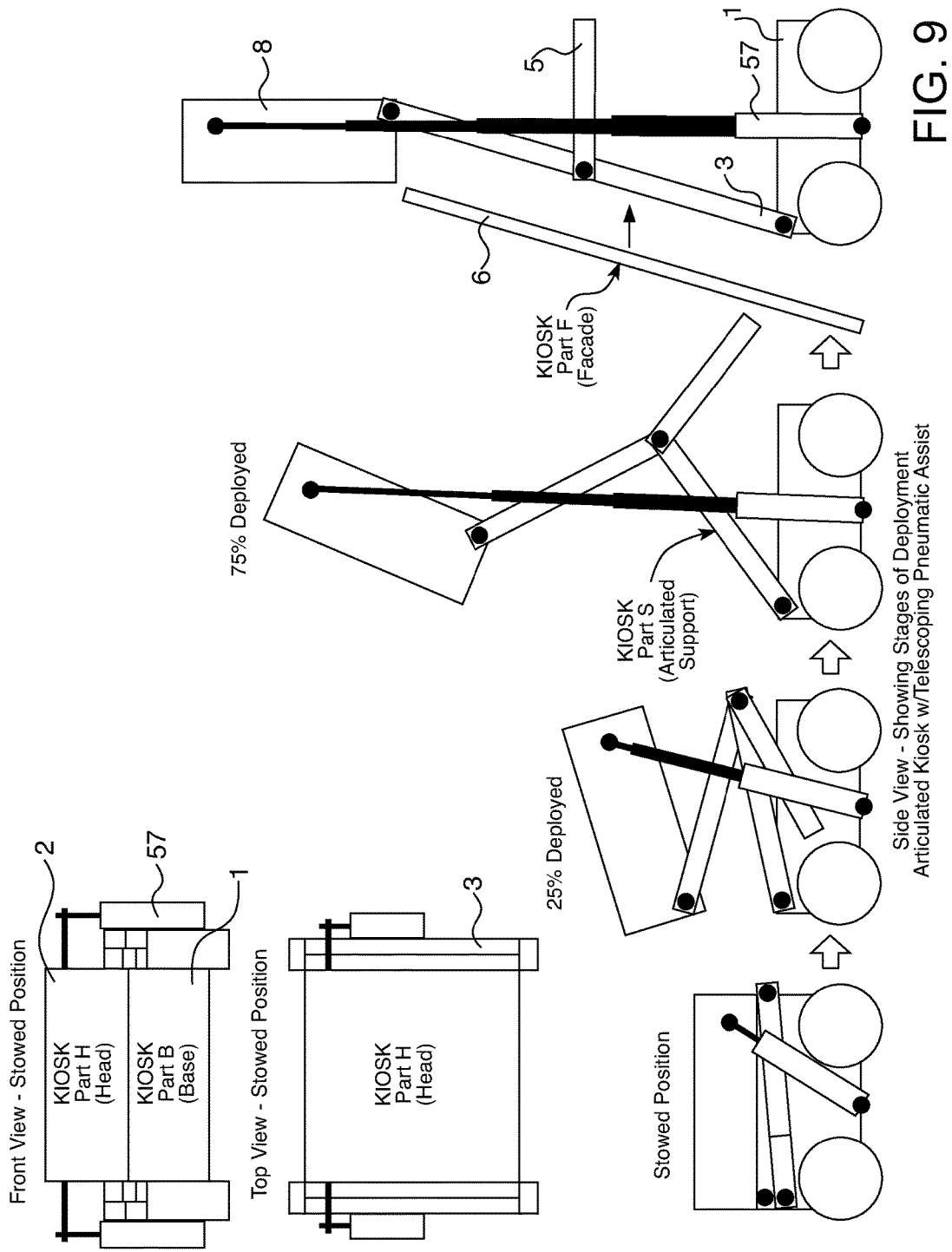
FIG. 9 depicts the kiosky with collapsible articulating components, as well as the mechanical assist for deploying the parts of the kiosk.

In another embodiment of the invention, the components that comprise kiosk 12 described above may be assembled as a unit and articulated with respect to each other (by use of a hinge or other known pivotal attachment means) such that kiosk 12 is collapsable to a compact unit, making it easily transported from one event location to another event in a different geographical location without special provisions. FIG. 9 shows the articulation of base 1 and head 2 as it is deployed from the stowed position to the fully deployed state for use at an event. In one embodiment, one or more pneumatic cylinders 57 are used to assist the user in unfolding the kiosk support 3 structure by simply releasing the locking mechanism which holds the kiosk in the collapsed position. In a preferred embodiment, the pneumatics or other mechanical assists can be telescoping, such as those manufactured by ERO-Help, Inc. The force exerted by the pneumatic cylinders should be sufficiently strong to raise the head 8, slowly and safely, to the fully deployed position, automatically and without any intervention by the user. As the kiosk is deployed, the printer shelf 5 rotates into a horizontal position on the articulated support 3. Finally, the façade 6 is attached to articulating support member 3. To collapse the kiosk after use, the user first remove the printer and façade, then the user exerts small downward force on the head (sufficiently strong to overcome the upward force exerted by the pneumatic cylinders, but well within the normal capability of any user since the cylinder force is balanced to offset the weight of the head/articulated support, collapsing kiosk 12 to the stowed position and latches the unit fixing it in the stowed position. In other embodiments of the invention, the pneumatic cylinders can be replaced by linear actuators and power screws. In another embodiment the linear extenders can be replaced with rotary actuators or servo motors at the pivot points in the articulated support 3.

Kiosk Functional/Operational Embodiments

Figure 2:
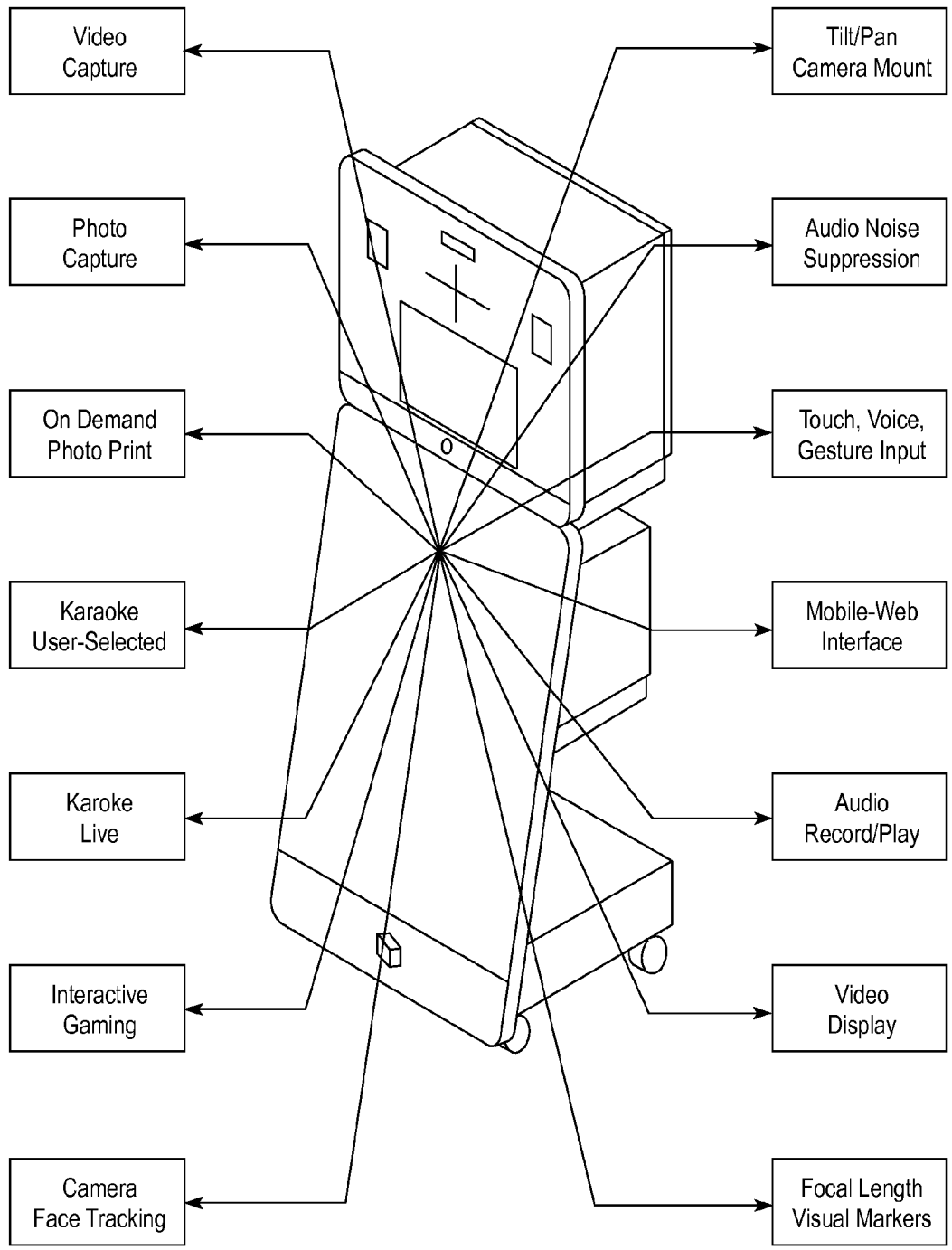
FIG. 2 is a block diagram depicting a number of the major features of the present invention design according to one embodiment of the invention.

FIG. 2 shows a number of the major features of the present invention design according one embodiment of the invention. Some of the major features may include: (1) videography, (2) photography, (3) audio recording and playback, (4) karaoke, (5) gaming, (6) photo printing, and (7) video and photo display.

Figure 3A:
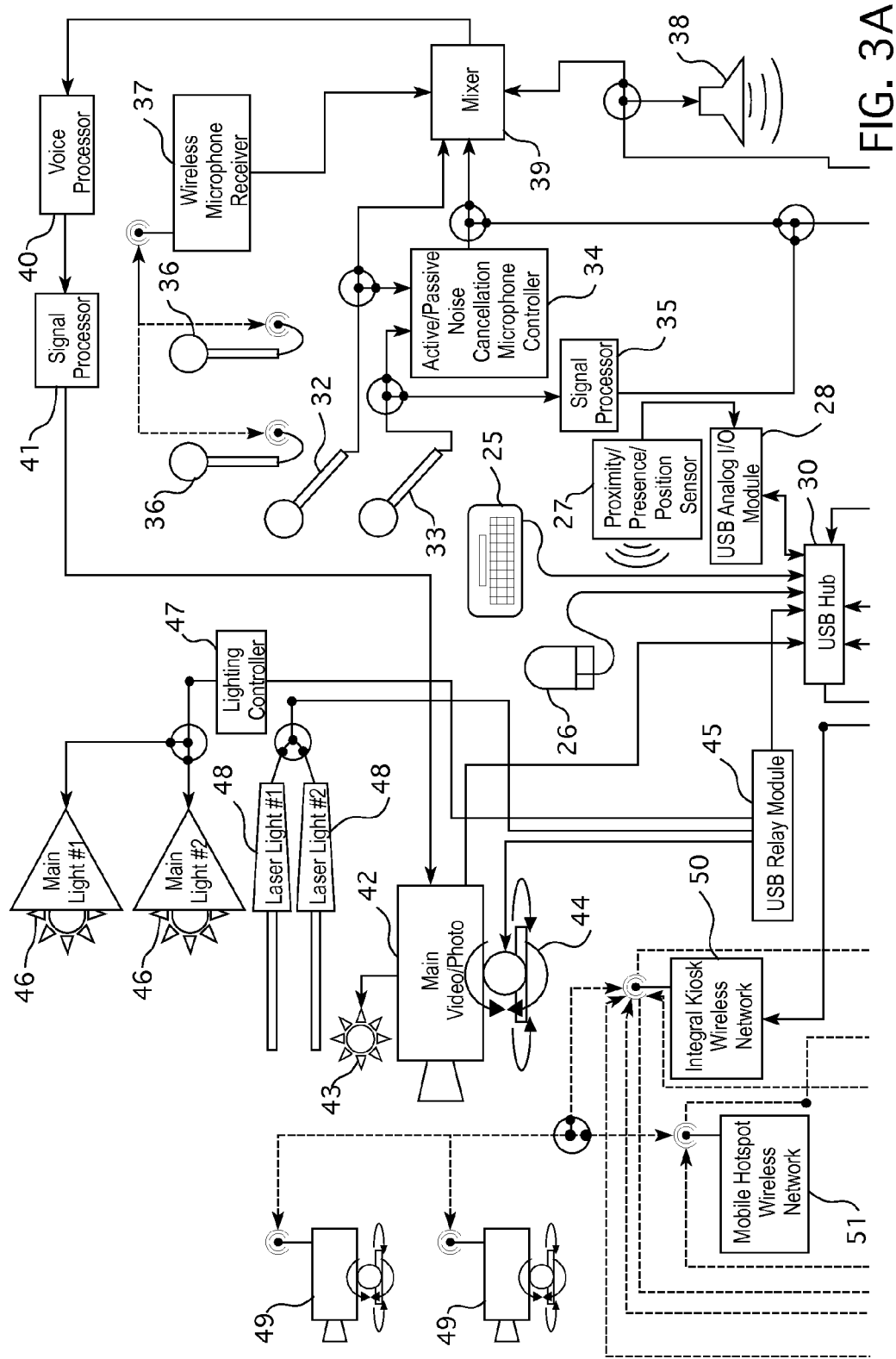
FIGS. 3A and 3B are schematic representations of the kiosk functional/operational components showing how they relate to one another, and how it is assembled according to one embodiment of the invention.
Figure 3B:
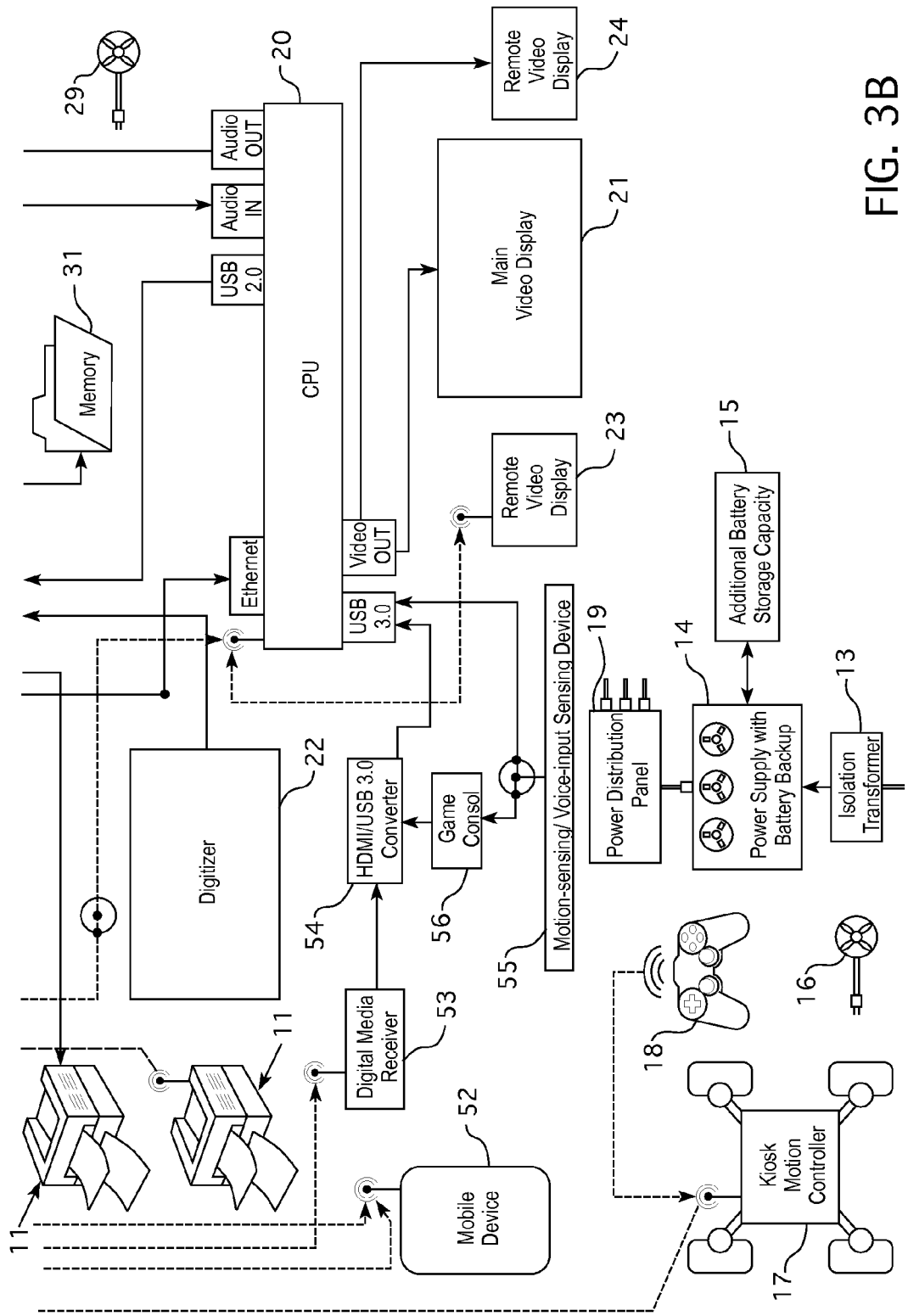

FIG. 3 is a schematic drawing of the kiosk operational components according to one embodiment of the invention.

Kiosk Description:

The following components may be housed within kiosk base 1: isolation transformer 13, universal power supply (UPS) 14, additional backup batteries 15, low-noise ventilation fan 16, kiosk motion controller 17, and a kiosk remote motion controller 18 (which is removed from base 1 during operation).

The function of isolation transformer 13 is to isolate all kiosk systems from power anomalies and electric interference emanating from the venue 120 VAC power supply. When not operating in the battery mode, the kiosk is can be plugged into a standard 120 VAC wall outlet for power or to recharge the kiosk batteries. Often during an event, building circuitry can be prone to voltage drops/surges due to overall electrical demand and/or harmonic distortions from DJ or Band equipment/amplifiers. Isolation transformer 13 (120 VAC/120 VAC) eliminates these potential conditions which can be problematic for the electronics in the kiosk.

Universal power supply (UPS) 14, which enables additional safety margin by providing surge protection and battery backup may be connected to the output of isolation transformer 13. One or more batteries can be used to power the recording and entertainment system in lieu of a plug into a standard 120 VAC power supply. This battery powered feature frees the kiosk from need to be near an outlet, which improves its mobility and which in turn allows more unique image capture of a broader range of events. One embodiment of the UPS is an APC Back-UPS Pro 1500. Additional backup batteries 15 (e.g., APC Back-UPC Battery Pack) may be connected to UPS 14 to allow kiosk 12 to operate for hours on battery power. UPS 14 allows kiosk 12 to perform its function and prevent data loss in the event of a power loss from the building electrical supply.

Low-noise ventilation fan 16 serves to remove heat from the enclosure of base 1 while in use.

In one embodiment, base 1 is equipped with kiosk motion controller 17 which allows the event facilitator to direct the movement of base 1 (and fully assembled kiosk 12) using hand-held kiosk motion controller remote 18, to easily move kiosk 12 from location to location. Alternatively, robotic drive unit/kiosk motion controller 17 can be controlled through the software on the kiosk computer 20 in response to inputs from the user interface, in response to a saved preprogrammed routing, or it can self-navigate around obstacles with input from installed sensors 27.

The following components may be housed within kiosk head 8: power distribution panel 19, computer (CPU) 20, main video display 21, digitizer 22, keyboard 25, mouse 26, various sensors 27, USB analog input module 28, low-noise ventilation fan 29, USB hub 30, additional memory drives 31, main microphone 32, crowd mic 33, active/passive noise cancellation microphone controller 34, signal processor 35, wireless microphone receiver 37, speakers 38, mixer 39, voice processor 40. signal processor 41, .camera 42, flash 43, rotating mount 44, USB relay module 45, main lights 46, lighting controller 47, integral kiosk wireless etwork 50, digital media receiver 53, HDMI/USB 3.0 converter 54, motion sensing/voice input sensing device 55, and game consol 56.

A single 120 VAC connector from the base 1 can feed power distribution panel 19 which functions to supply both AC and DC to all components in the enclosure. Panel 19 includes terminal strips, transformers and relays.

Computer (CPU) 20 controls all the functions of kiosk 12 running user interface operating system software, one embodiment of which is detailed in FIGS. 5A-5K. In one embodiment, CPU 20 may be a desktop computer or a laptop/tablet computer. At a minimum, computer 20 must be equipped with USB, wireless networking, and audio I/O connections. In the case of a laptop computer, main video display 21 and digitizer 22 can be integral to the computer. Any number of laptop computers can be used, but the Lenovo X220 Tablet is the presently preferred laptop. In another embodiment wherein CPU 20 is a desktop computer, main video display 21 and digitizer 22 can be separate components. In another embodiment, CPU 20 can also be any smart mobile device (e.g., using iOS, Android or other mobile operating systems) including an iPad or iPhone, and can also be a tablet device compatible with Windows/MacOS operating systems such as those running Windows RT operating systems. Additional remote video displays 23 and 24, not integral to, but separate from kiosk 12, may be used to display data or video that is the same or different from those displayed on main video display 21. Additional remote video displays 23 and 24 may be tethered to kiosk 12 via USB and/or may be separate wireless remote video displays.

In one embodiment, when kiosk 12 is idle (i.e., not actively in the recording/photo cycle), display 21 shows an image and/or video customized for the event. In another embodiment, when kiosk 12 is idle for a given period of time, display 21 plays a second image and/or video customized to the event, which may be promotional advertising.

The user interface software, one embodiment of which is detailed in FIG. 5A through 5K, enables a user to control the kiosk using various inputs/commands to the CPU 20. Interacting can be done using digitizer panel 22. However, CPU 20 may also respond to inputs from keyboard 25, mouse 26, or various sensors 27, all of which are USB in the current embodiment. Analog sensors 27 (e.g., position/proximity) in the current embodiment use USB analog input module 28 or other similar devices, such as those manufactured by Phidgets, Inc. CPU 20 also can respond to a means for voice control thereof, such as verbal commands using voice recognition software. In one embodiment, Dragon® Voice Recognition software can be used for this purpose. CPU 20 can also be controlled wirelessly using mobile device 52.

During use, presence or proximity sensor 27 can detect users within range of kiosk 12. In one embodiment, if a user is not detected within a set period of time, the recording/photo cycle is ended to prevent "run-on" recordings that unnecessarily use camera and CPU memory. In another embodiment, if sensors 27 detect a user within range of kiosk 12, CPU 20 plays various audio recordings to invite the user to use the kiosk 12.

Low-noise ventilation fan 29 can be used to remove heat from the enclosure of head 8 during use.

USB hub 30 may be used to increase the number of USB ports to support several USB connected peripheral devices. The USB devices may include printers, relays, sensors, keypads, mice, memory, and other similar devices.

To increase the reliability of the computer data storage, one or more additional memory drives 31 may be added and configured in various RAID arrangements (e.g., RAID 1).

Means for audio noise suppression are provided. Kiosk audio recording system components 32-41 focus on the range of frequencies of the human voice, processing out higher and low frequencies, and reducing background noise. As a result of this novel approach, user recordings on the kiosk are audible even in the noisiest sound fields such as that from a DJ, live band, or rock concert. The audio system also has playback and amplification functionality to play pre-recorded music stored on the CPU for entertainment and karaoke. The system components record sound from a multiplicity of sources using stationary, kiosk mounted and wireless microphones 32 and 36 to record users. Stationary crowd microphone 33, which can be mounted on the kiosk or be remote, is used to accomplish background noise cancellation. All recorded audio is processed and input to camera 42 which syncs audio with recorded video. Audio is also fed to CPU 20 to facilitate karaoke song recognition and verbal commands to the user interface software.

Main microphone 32 can be mounted to kiosk 12 and selected to be flexible/repositionable to accommodate users of varying height. One embodiment is a cardioid gooseneck mic such as the AKG CGN99C/S. Crowd microphone 33 can be positioned to concurrently record background noise and not user vocals. In another embodiment there can be a second cardioid gooseneck mic such as the AKG CGN99C/S. Both audio streams can be fed into active/passive noise cancellation microphone controller 34, which electronically partially subtracts the crowd mic 33 audio track from the main mic 32 audio track, thereby lowering the extraneous background noise from the user vocals that are to be recorded. In another embodiment, the audio track from main mic 32 can be conditioned to be input directly into the CPU 20 by signal processor 35, and the audio can be recorded without noise cancellation.

One or more hand-held wireless microphones 36 may be used to record user vocals that are outside the range of main mic 32, such as when the user wishes to record events taking place on the dance floor. Wireless mics 36 are matched to wireless microphone receiver 37 to process the vocals transmitted from wireless mics 36. In one embodiment, the wireless mic/receiver system can be an AKG WMS40Pro.

In one embodiment of the karaoke mode of operation, CPU 20 plays a prerecorded karaoke song track and displays the accompanying lyrics. The audio output from the computer can be amplified and played through speakers 38 mounted to the kiosk.

The audio captured by main mic 32, directly or after post-processing in noise cancellation microphone controller 34, wireless mics 36, and audio output from CPU 20, are combined by mixer 39 into one audio signal. In one embodiment mixer 39 can be a Rolls MX54s. Mixer 39 allows independent manipulation of each audio track to balance the output into one audio stream.

Output from mixer 39 is input into voice processor 40 which functions as a mic pre-amp and improves the quality of the audio to be recorded. In one embodiment, voice processor 40 can be a Behringer Ultravoice VX2496 which provides an opto-compressor, dynamic enhancer, expander, de-esser and tube simulation.

To prepare the audio signal to be recorded by camera 42, the signal is input into a direct box (DI) 41 which performs level matching, balancing, and active buffering or passive impedance matching/impedance bridging to minimize noise, distortion, and ground loops.

Camera 42 can be controlled by CPU 20 to record video and takes still photos. In one embodiment, camera 42 can be a Canon EOS D5. In other embodiments, camera 42 can be a Nikon D-5000 or any other digital camera that supports remote computer control. The audio signal to be recorded from DI 41 is input through the Mic-IN connection to camera 42, allowing camera 42 to sync the audio/video signals. Recorded images and video can be stored in the internal memory device of camera 42 or elswhere. When the internal camera memory device becomes full, CPU 20 can direct a file transfer from the camera memory to CPU 20 and after confirming it is complete, delete the file(s) from the camera memory to provide capacity for additional recordings/images. In one embodiment, images or other content are immediately transferred to CPU 20 to facilitate reproduction/printing on demand/transmission.

When taking photos, additional illumination can be provided, as needed and as directed by camera 42. This can be accomplished by use of kiosk-mounted strobe/flash light 43. Any strobe/flash compatible with camera 42 selected can be used.

A means for tilting or panning one or more cameras 42 is provided. Camera 42 may be attached to tilt/pan mount 44 to permit camera 42 to center the subject to be recorded within the camera field-of-view. In one embodiment, the tilt/pan mount orientation of camera 42 can be controlled via the user interface which allows the user to adjust the image to be recorded using the digitizer 22 with reference to a preview display on main video display 21. Users can touch digitizer 22 in accordance with the user interface software to move camera 42 up/down and left/right to center themselves in the field of view. In another embodiment, CPU 20 uses a face-tracking algorithm to move camera 42 into position dynamically in response to user movement during recording. This dynamic control is especially useful when the subject(s) to be recorded are actively moving, as is the case when kiosk 12 is located on a dance floor. The movement of tilt/pan mount 44 can be controlled through USB relay module 45, which is controlled by CPU 20, and provides power to the mount motor(s) in the desired direction of travel.

When recording video, illumination of the subject is accomplished using lighting fixtures 46 mounted to the kiosk. While led array is the preferred embodiment, lighting fixtures 46 can be florescent or incandescent. The intensity of lighting fixtures 46 is controlled using the lighting controller 47. In the preferred embodiment, the voltage to main lighting fixtures 46 is controlled by CPU 20 and includes a manual over-ride to allow the event facilitator or adjust the intensity manually.

To ensure the subject to be recorded stays within the camera field of view throughout the recording cycle, kiosk 12 can use two or more projections from laser lights 47. Laser lights 47 can project lines onto the floor, to provide the subjects with a visual confirmation that users are within the field of view of the camera 42, thereby enhancing the probability that users are being recorded. The laser light 47 projections are set to match the focal length of the lens attached to camera 42 and can be changed if a different lens is used. In another embodiment, laser lights 47 move proportionally with camera 42 as it pans. These features are especially useful when the subjects are in motion, such as when kiosk 12 is on a dance floor. The kiosk user interface also continually displays the image of what is presently being recorded as a reduced scale image on the kiosk main video display 21, providing separate visual confirmation that the users are being recorded as intended. This feature is especially useful when the subjects are proximal to kiosk, 12 such as when a testimonial is being recorded.

One or more additional wireless remote cameras 49 may be located throughout the venue to record the event from several perspectives. In one embodiment, wireless camera 49 is located to record a second point of view as subjects are using kiosk 12. In another embodiment, wireless camera 49 is positioned at a high point in the venue or as part of kiosk 12 to achieve a bird's eye perspective. One preferred embodiment of wireless remote camera 49 is the Easy Watch EWIP-DOM-WIFI, which can be controlled remotely by the event facilitator using another computer or hand-held mobile device, and which can transmit video corded to CPU 20, to a second CPU located remote to the venue, and/or streamed to the internet. In another embodiment, the guest(s) of honor are outfitted with unobtrusive/camouflaged miniaturized wireless remote video camera(s) 49 that permit recording of the entire event from their perspective.

Users can print photo(s) taken by camera 42 on demand. Camera 42 takes a number of photos of the subject(s) in succession and may permit the user to select which photo to print or may permit the user to print all photos as a group. In the preferred embodiment, printer(s) 11 can be thermal dye-sublimation photo printer attached to kiosk 12 and can deliver the photo to the user directly. Printer 11 can also be an ink jet or laser printer. To print, photos are transferred to CPU 20 from the memory device of camera 42, shown on display 21, and after the choice is selected by the user, sent to printer 11 for a hard-copy. When printer 11 is integral to kiosk 12 it can tethered to CPU 20 via USB cable. Alternatively or in addition, printer 11 may be remote from kiosk 12 and photos to be printed may be transmitted wirelessly to remote printer 11. Photos can also be wirelessly transmitted to a second computer to allow an editing of the photos using photo editing software.

Kiosk 12 may be equipped with wireless network router 50 to enable a local network to facilitate the communication of the various devices within and outside kiosk 12 at the event. In one embodiment, wherein the venue has an accessible internet network connection, the kiosk may connect to the internet via that gateway. In the event that no internet connection is accessible, kiosk 12 can be equipped with mobile hotspot device 51 to connect to the internet as needed.

The event facilitator may control the functionality of kiosk 12 using mobile device 52 running iOS, AndroidOS, or other mobile OS. In one embodiment, mobile device 52 (e.g., iPhone, iPad, Droid, or other Tablet), using the kiosk utility app, can control all kiosk features and download event-specific programming setup parameters to kiosk UIOS. In another embodiment, a means for recognizing songs being performed and displaying corresponding lyrics on display device 21 is provided. Mobile device 52 can run a music recognition app (e.g., Soundhound) and connect to the kiosk via its mobile network or via the mobile hotspot, recognize the song being played by the DJ, and display song lyrics in sync with the music. The mobile device display can then be mirrored on main display 21 using kiosk local wireless network 50 to interface with a digital media receiver 53 (e.g., Apple TV), and then converting the HDMI output of the digital media receiver 53 to a USB input to CPU 20 using HDMI/USB convertor 54 (e.g., Blackmagic Intensity), which allows CPU 20 to receive the mobile device display as webcam stream.

In one embodiment, kiosk 12 is equipped with an interactive gaming means to facilitate guest interaction and create unique recorded content. Examples of interactive gaming means suitable for this purpose are known to the artisan and are in commercial use in other settings today. Motion-sensing/voice-input sensing device 55 (e.g., Kinect by Microsoft) translates body gestures and verbal commands into digital inputs to commercial or proprietary software. The device features an RGB camera, depth sensor and multi-array microphone running proprietary software, which provides full-body 3D motion capture, facial recognition and voice recognition capabilities. In one embodiment, motion-sensing/voice-input sensing device 55 is connected to dedicated game console 56 (e.g., Xbox by Microsoft). The video output of game console 56 is connected to HDMI/USB 3.0 converter 54 to translate the video signal (e.g., HDMI) to a USB input to CPU 20 and displayed as webcam input on main video display 21. To facilitate user/guest interaction with kiosk 12 and to capture video and photo content of the action, game console 56 can run proprietary or commercially available software (e.g., Dance Dance Revolution for Microsoft Xbox by Konami). In another embodiment, motion-sensing/voice-input sensing device 55 can be connected directly to CPU 20 using a USB input port. Proprietary software or apps, created with the Kinect software development kit for Windows written in C++/CLI, C#, or Visual Basic .NET, can reside on CPU 20 and may be played while the video/photo content is simultaneously captured by kiosk 12.

Karaoke Description:

Kiosk 12 can play karaoke and concurrently record video and capture photos of users performing. There are at least two modes of operation: 1. pre-recorded karaoke, where libraries of music and corresponding lyrics are stored on CPU 20, and 2. live music karaoke, where live music played by a band or DJ is identified and synchronized lyrics of the live music are displayed on display device 21. In one embodiment of live music karaoke, mobile device 52 can run a music recognition app (e.g., Soundhound or Shazam), which is able to recognize the song being played and display lyrics in sync with the live music, and the synchronized lyrics are mirrored on display device 21 using digital media receiver 53. In another embodiment of live music karaoke, CPU 20 can run a music recognition codex (e.g., Echoprint). The API recognizes the live music and displays lyrics in sync with the music on display 21.

Figure 4:
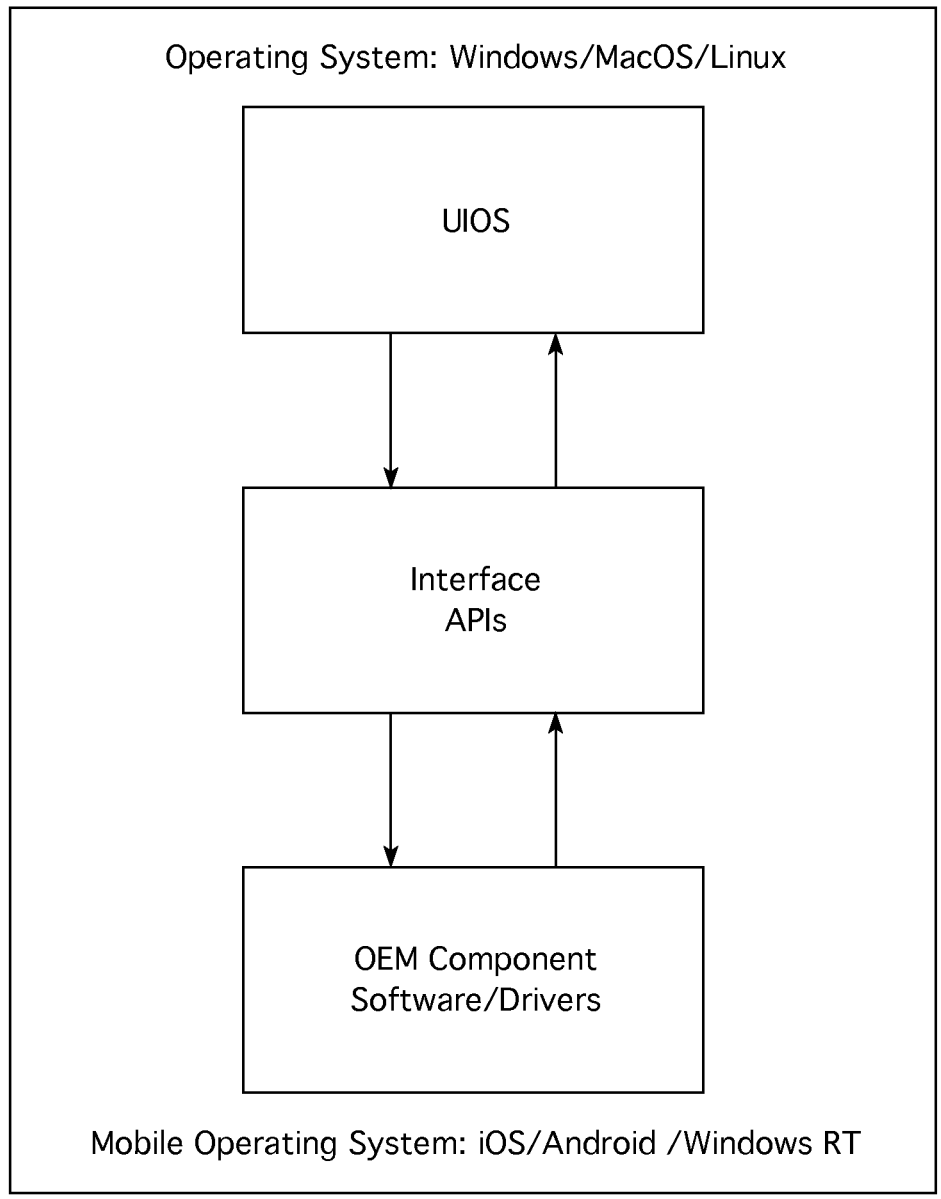
FIG. 4 is a flow diagram showing the kiosk control system hierarchy.
Figure 5A:
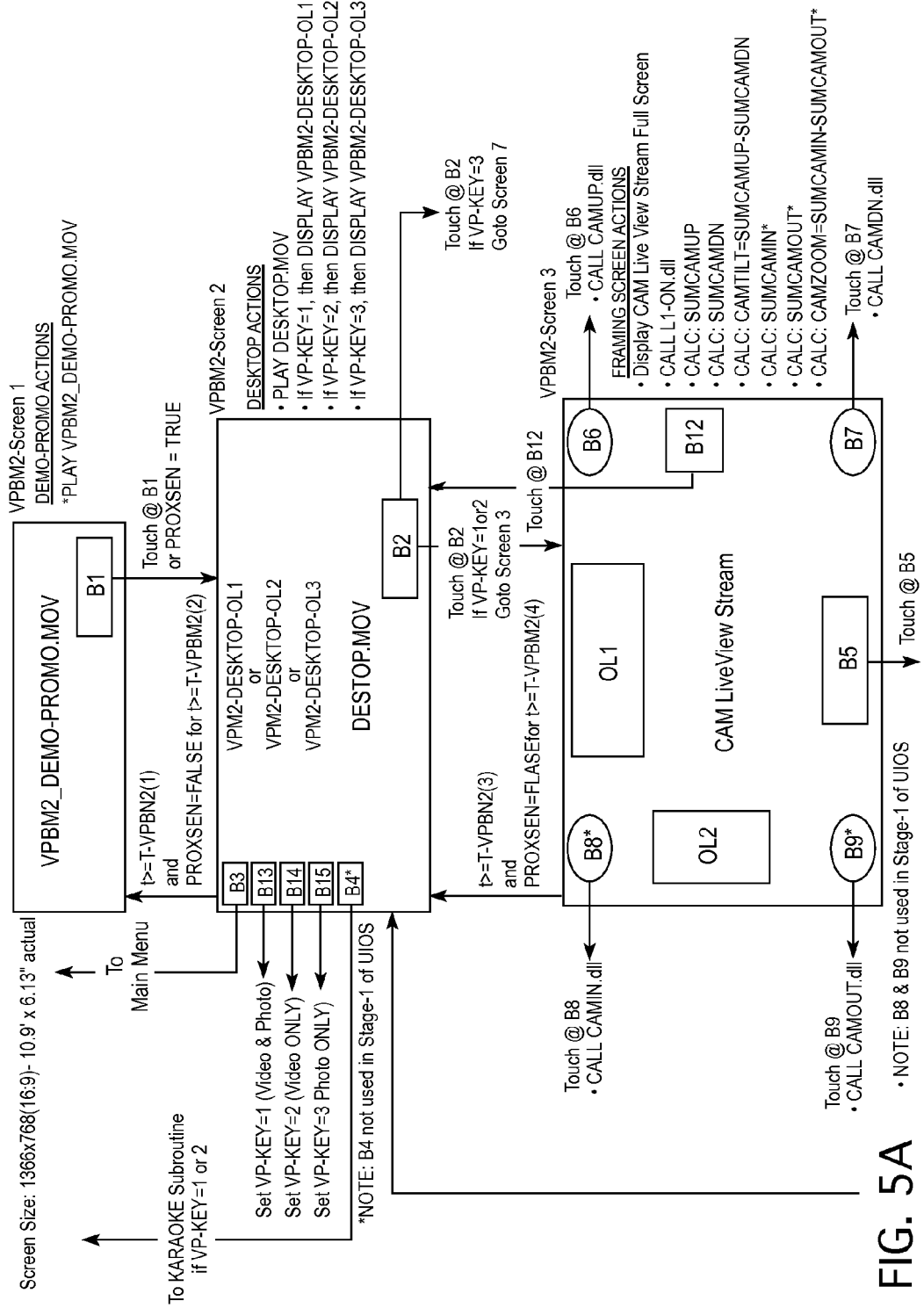
Figure 5C:
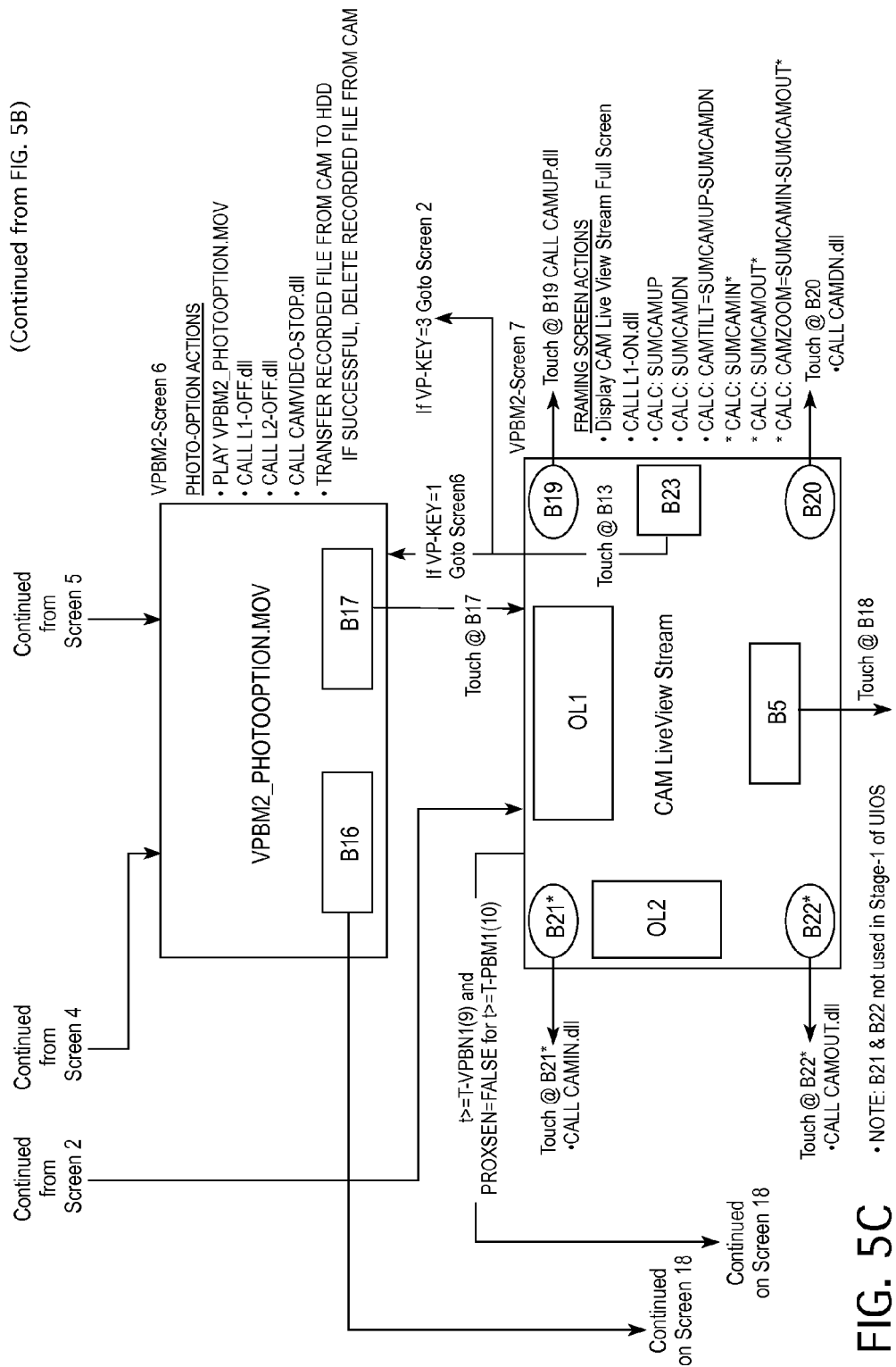
Figure 5D:
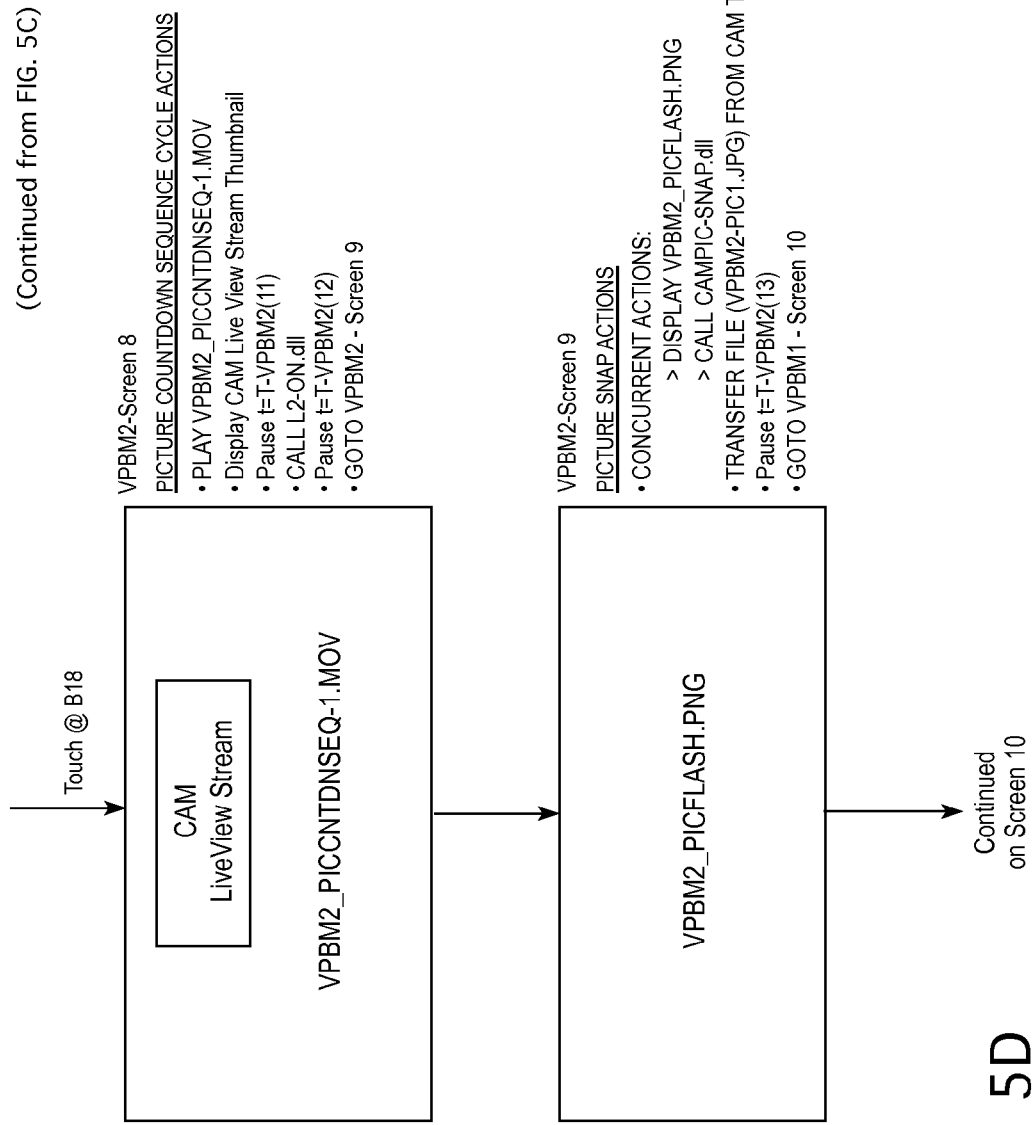
Figure 5E:
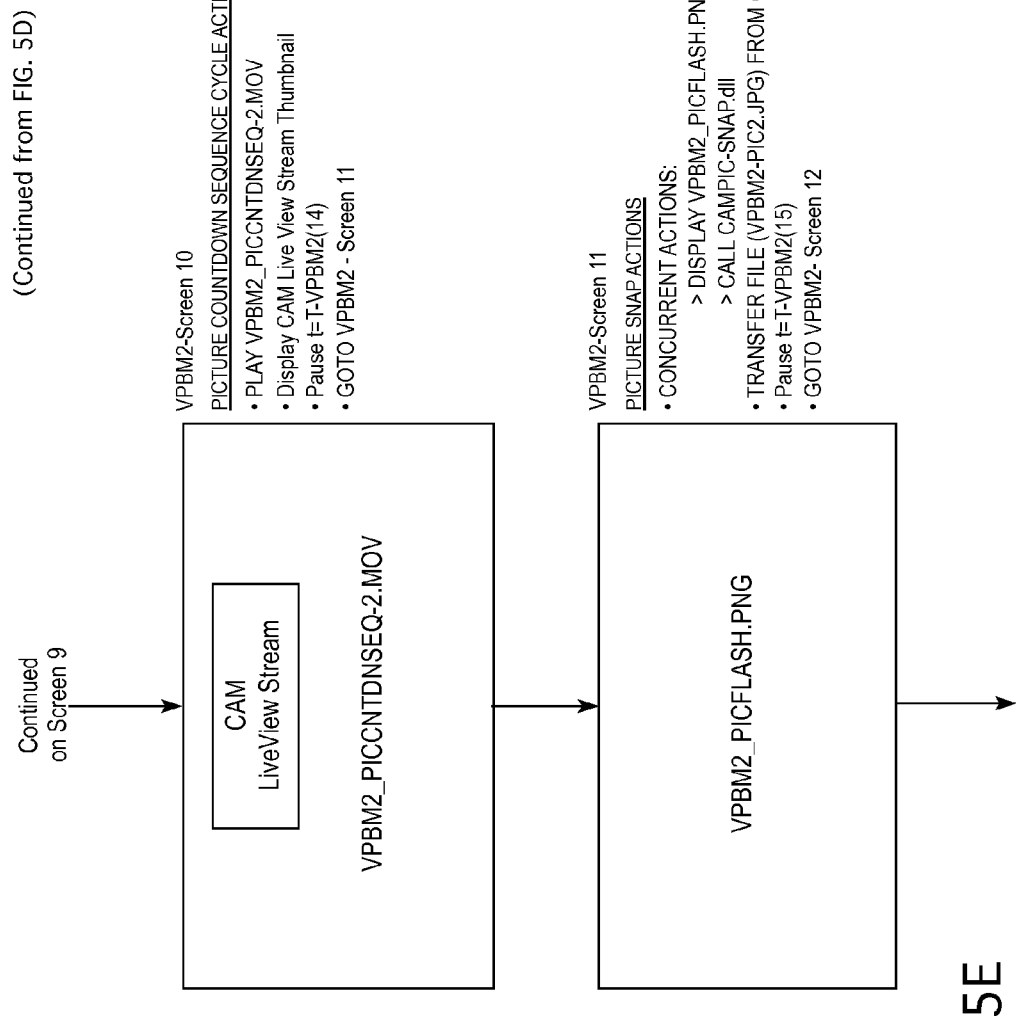
Figure 5F:
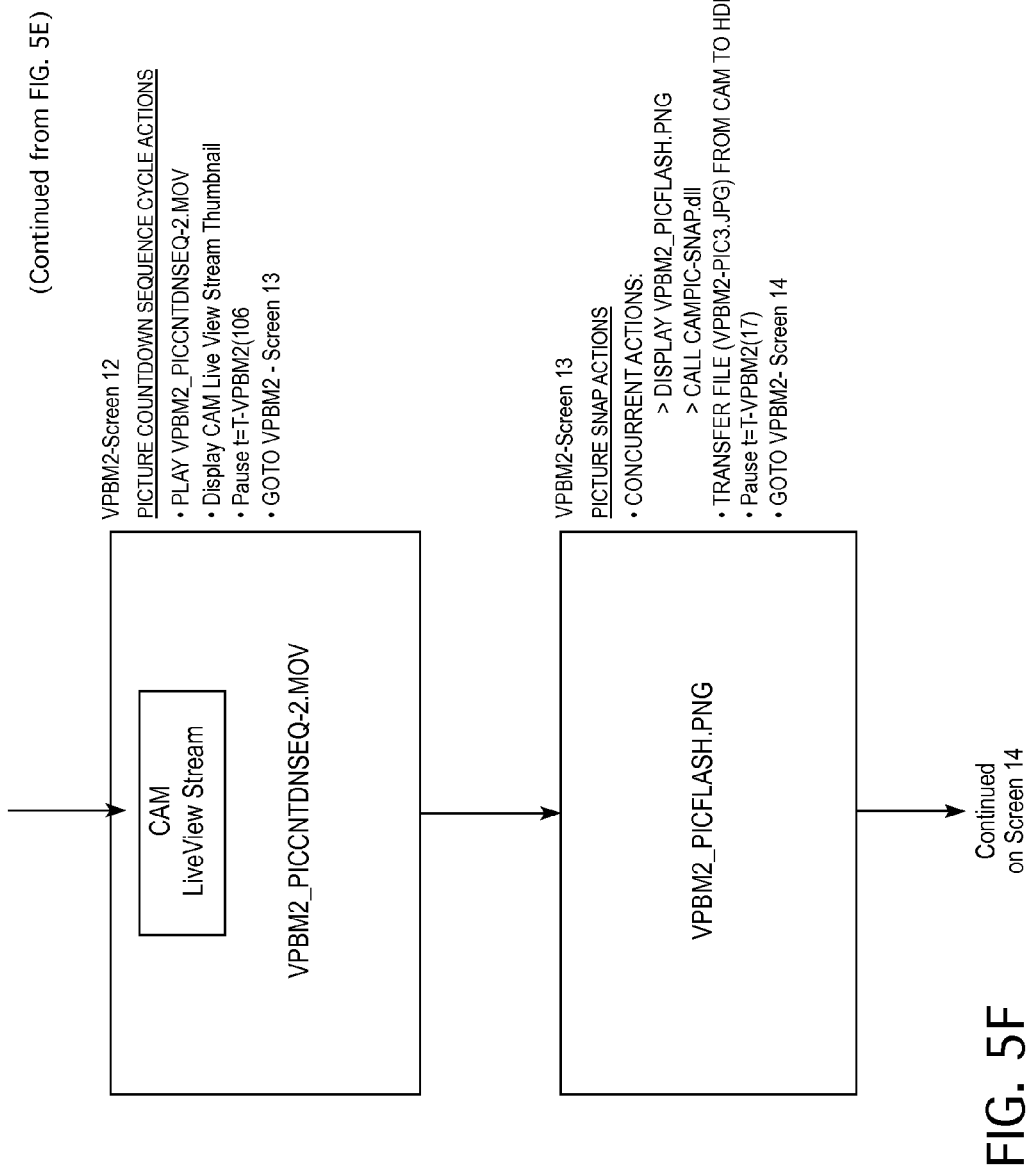
Figure 5G:
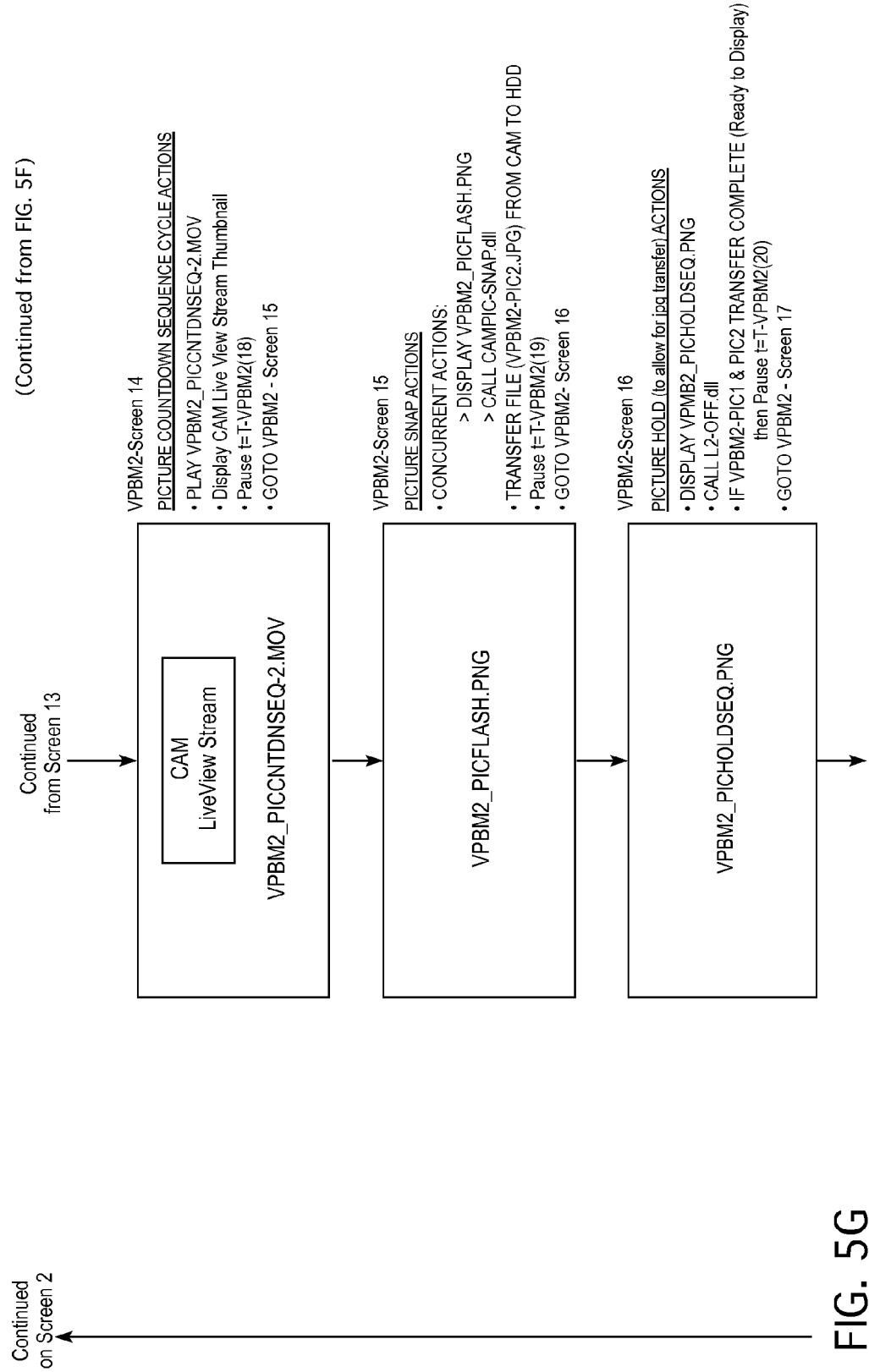
Figure 5I:
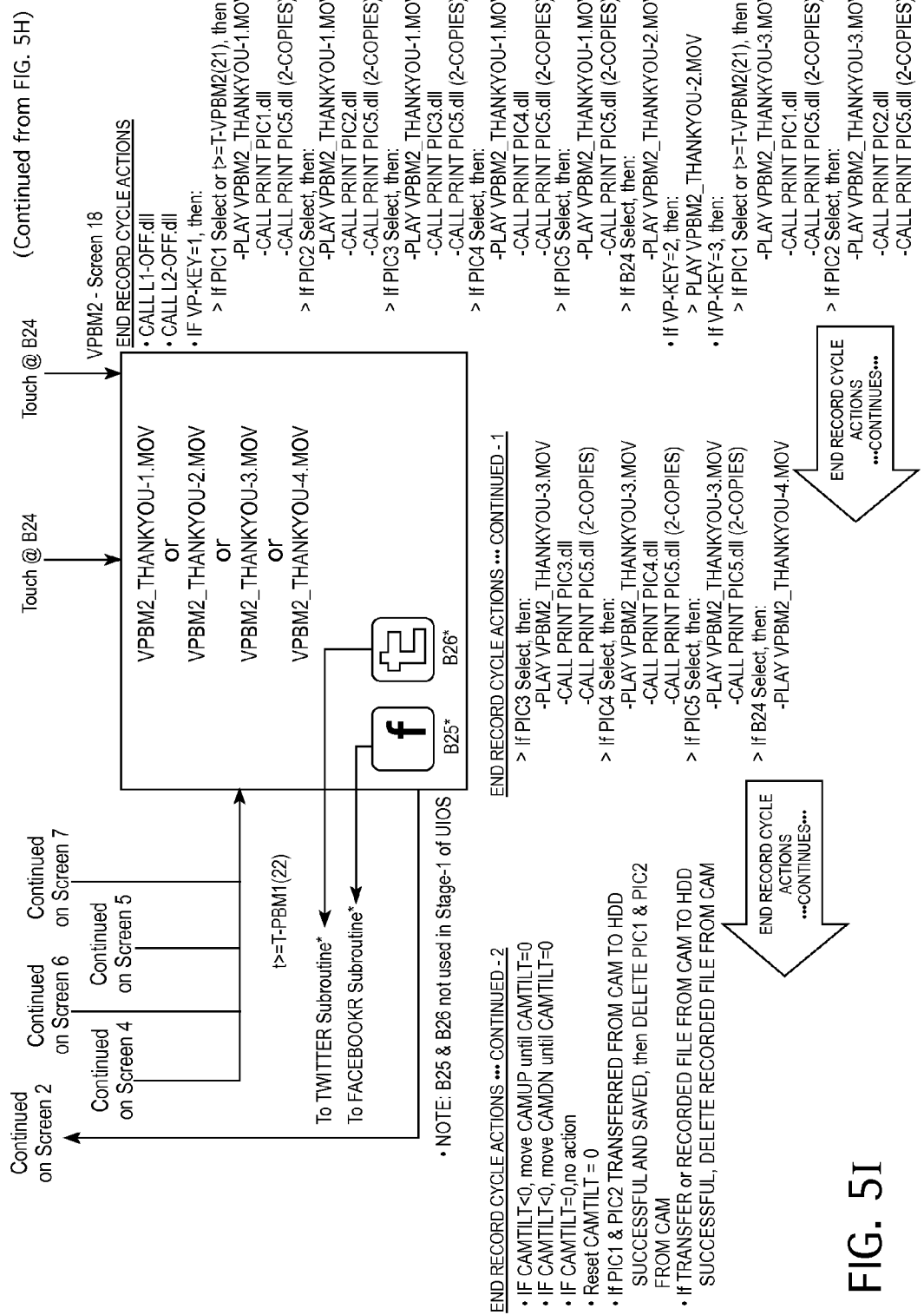

Kiosk Control System:

The kiosk control system may consist of a User Interface Operating System (UIOS), Application Programming Interfaces (APIs), Dynamic-Link Libraries (DLLs), and OEM component APIs, drivers, and software, shown generally in FIGS. 5A-5K. These programs can be run on any commonly used computer operating system such as Windows, Mac OS, or Linux. In one embodiment, computer 20 uses the Windows operating environment by Microsoft (e.g., Windows 7) as a graphical operating system. The control system hierarchy is shown in FIG. 4. The UIOS is a graphical interface with the user displayed on main display 21. The user directly controls the operation of kiosk 12 via inputs from the touch screen (i.e., digitizer 22), verbal commands, gestures, or other sensors (e.g., proximity sensors 27) via the UIOS. The UIOS communicates with all kiosk functional/operational embodiments and peripheral components (e.g., camera 42, lighting 46, printer 11, et al.) using application specific APIs to communicate the Input/Output (I/O) instructions to the OEM component API/Drivers.

For purposes of illustration, a user touches digitizer screen 22 to begin the video recording utility, the UIOS commands main lights 46 to turn on to illuminate the subject and displays the image of the subject as seen by camera 42. The user is provided with several means for confirming that objects of visual content capture are centered within the field of view of camera 42. One such means is by altering camera 42's tilt/pan position in response to touch screen inputs. The UIOS can then call the appropriate API to command motorized camera mount 44 to reposition camera 42. Once centered, the user touches digitizer screen 22 to begin the recording and the UIOS calls the BEGIN RECORD VIDEO API which interfaces with the camera control software, and begins recording a video as a file (e.g. .avi, .mov, .mpeg, etc.) stored on the internal memory card of camera 42. The recording continues until the user touches the digitizer screen 22 to end the video, time exceeds the time allotted, or the user walks out of the range various proximity/presence sensors 27 (which prevents run-on recordings). The UIOS calls the STOP RECORD VIDEO API which interfaces with the camera control software, and ends the recording and closes the media file, and commands, via the interface APIs, lights 46 to turn off and the camera tilt/pan to return to it neutral position. From time to time the UIOS polls the camera memory card and if it is more than certain percentage full (which is a variable that can be changed from time to time in the kiosk setup file) and the kiosk is not occupied with other evolutions, it initiates a file transfer of media files to the internal storage device of CPU 20, such as a hard disk drive or solid state disk drive, and only after a hand-shake to confirm the file has been fully transferred to the internal storage of CPU 20, it deletes the file from the camera's memory card.

As a second illustration, a user touches digitizer screen 22 to begin the photography utility, the UIOS commands main lights 46 to turn on to illuminate the subject and displays the image of the subject as seen by camera 42. The user is provided the opportunity to ensure they are centered within the camera field of view by altering the tilt/pan position of the camera in response to touch screen inputs, then calling the appropriate API to command the motorized camera mount to reposition the camera. Alternatively, the user can allow imbedded face-tracking software to automatically center the camera field-of-view on the subjects to be recorded. Once centered, the user touches the digitizer screen to begin the taking photos and the UIOS calls the TAKE PHOTO API which interfaces with the camera control software, and snaps a photo as a media file (e.g., .jpg) stored on the camera internal memory card. After a predetermined number of photos are snapped, the UIOS commands via the interface APIs, the lights to turn off and the camera tilt/pan to return to it neutral position. The UIOS immediately initiates a file transfer of .jpg files to the CPU internal storage, and only after a hand-shake to confirm the file has been fully transferred to the CPU memory, it deletes the file from the camera memory card. The UIOS displays the photos transferred and allows the user to select the photo to be printed by touching the digitizer, then calls the PRINT PHOTO API to interface with the Printer Driver, and print the photo(s) immediately upon on-demand.

One embodiment of the UIOS, which has video and photo functionality, the sequence of operations is schematically depicted in FIG. 5A through FIG. 5K. The software is written in C# using WPF in a .NET framework. The UIOS uses DLLs and APIs to access/control the software for individual components (e.g., camera, relays, et al) which together represents a system as described herein. Other possible embodiments of the software can be written in Objective-C on MacOs or iOS, C/C++on Linux, et al.

The UIOS can be tailored to each specific event/use by loading the Event-File containing event-specific programming setup parameters. Means for internet communication of visual or audio content captured by the recording and entertainment system disclosed herein are provided. In one embodiment this file is transferred locally to the CPU and in another embodiment this file is downloaded via the internet. The UIOS can connect to the internet and interfaces with internet/mobile applications, such as Twitter and Facebook, to allow users to link/upload recorded images/video to social networking websites such as YouTube, Google+ and others.

Figure 6:
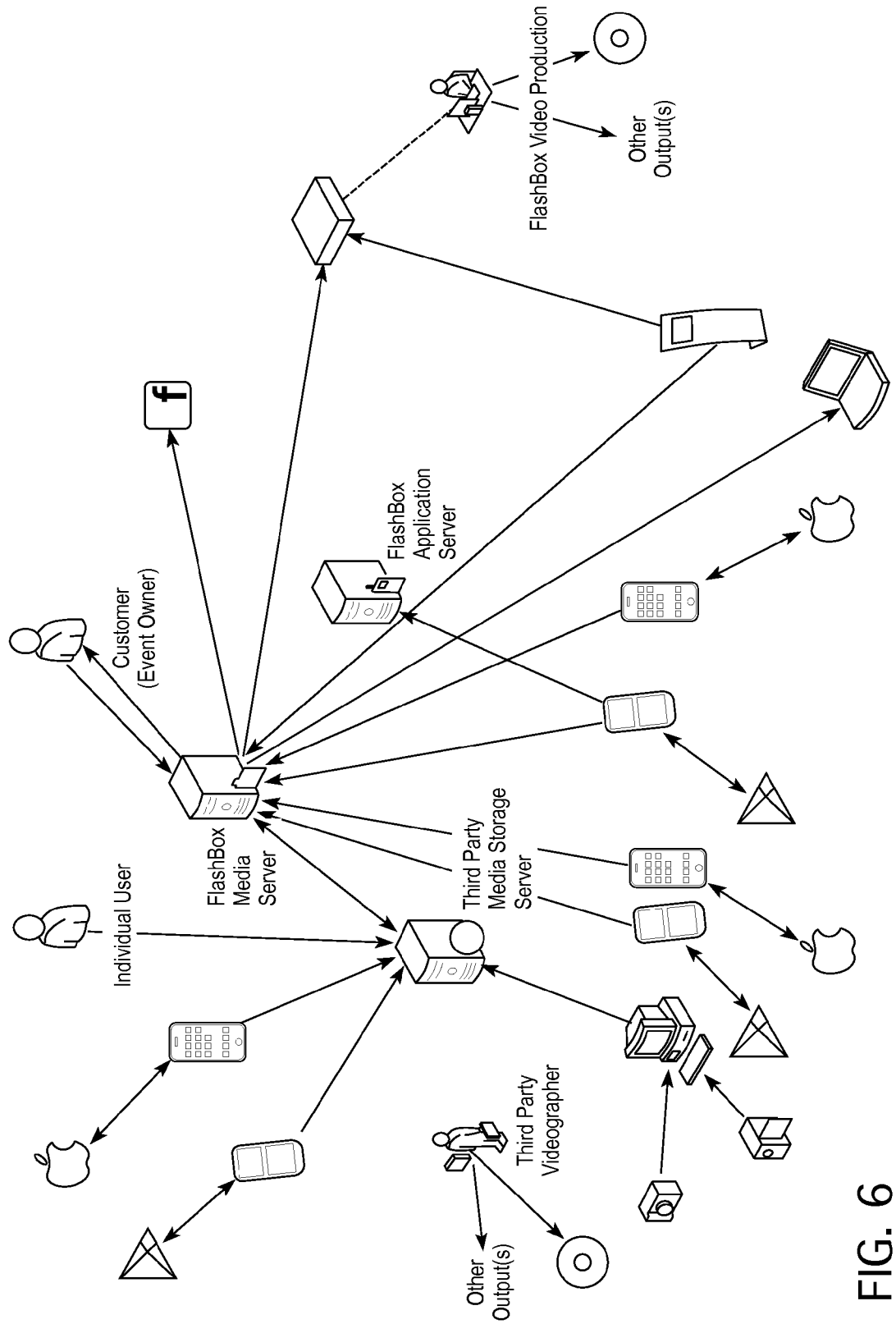
FIG. 6 is a schematic diagram that depicts communication flow between various system/components in the process of event production, according to one embodiment of the invention.

UIOS Utility App:

The UIOS Utility App enables a mobile device to control all kiosk functional/operational embodiments and peripheral components (e.g., camera, lighting, printer, et al.) and download event-specific programming setup parameters to the UIOS. In one embodiment of the invention, the UIOS Utility App mirrors the kiosk display functionality and touching the mobile device display functions as remote I/O control panel. FIG. 6 depicts one embodiment of the communication flow that can be used between the various systems/components, although other communication flows are also possible.

Photo/Video App

Figure 7:
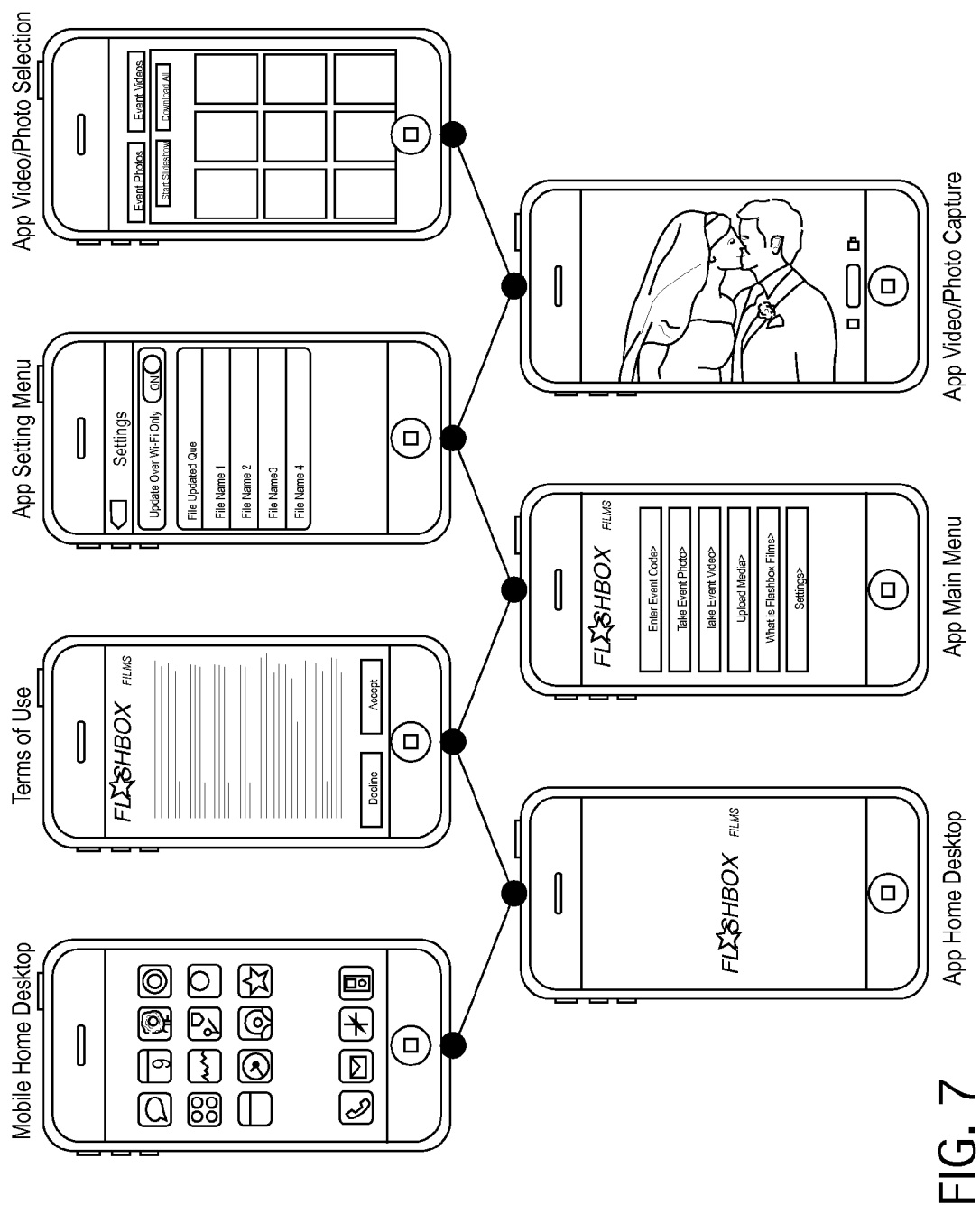
FIG. 7 is diagram showing screen shots of the Photo/Video Mobile App according one embodiment of the invention.

Photo/Video App enables any supported mobile device (and any guest at the event who is using one) to take and upload photos and video to a group-website for inclusion into the event video production. FIG. 7 depicts a typical smart mobile device 52 (e.g., iPhone) showing the navigation between screens illustrating the functionality and use in one embodiment of the invention. The content is available for the client to use at their discretion and included in the event video.

Socialization App:

A hashtag is used on social media sites such as Twitter and Instagram. It is a word or phrase preceded by a hash or pound sign (#) and used to identify messages on a specific topic. A hashtag is simple a way for people to search for tweets/posts that have a common topic and to begin a conversation. For example, if you search on #LOST (or #Lost or #lost, because it's not case-sensitive), you will get a list of tweets related to the TV show. Tweets that say "I lost my wallet yesterday" will not be found because "lost" isn't preceded by the hashtag.

The operator of the system (with help from the client) can suggest the hashtag. It could be preceded by the bride and groom's first or last names, for example (#bethandjohn-swedding). The hashtag will direct guests, family and friends to regular updates and behind the scenes activity leading up to the event. The bride and/or the groom will also deploy the updates with the assistance of the kiosk operator's staff, offering suggested post updates to the bride and/or groom on a regular basis. The hashtag will allow followers to find the wedding topic quickly and to start conversations with others related to the wedding.

Through the save-the-date notice, the invitation, and the day of the wedding, guests will be asked to use the hashtag to update their first-hand account and personal experience of the wedding. Instructions will be available at the wedding and/or through the kiosk for those who are less social media savvy. Guests can upload videos and photos through the preferred social media feed of the client. The wedding will be documented digitally through a social channel allowing more interaction and involvement from others who may not be able to attend. The comments, video and photos posted on the Twitter feed will be used in the video production.

Figure 8:
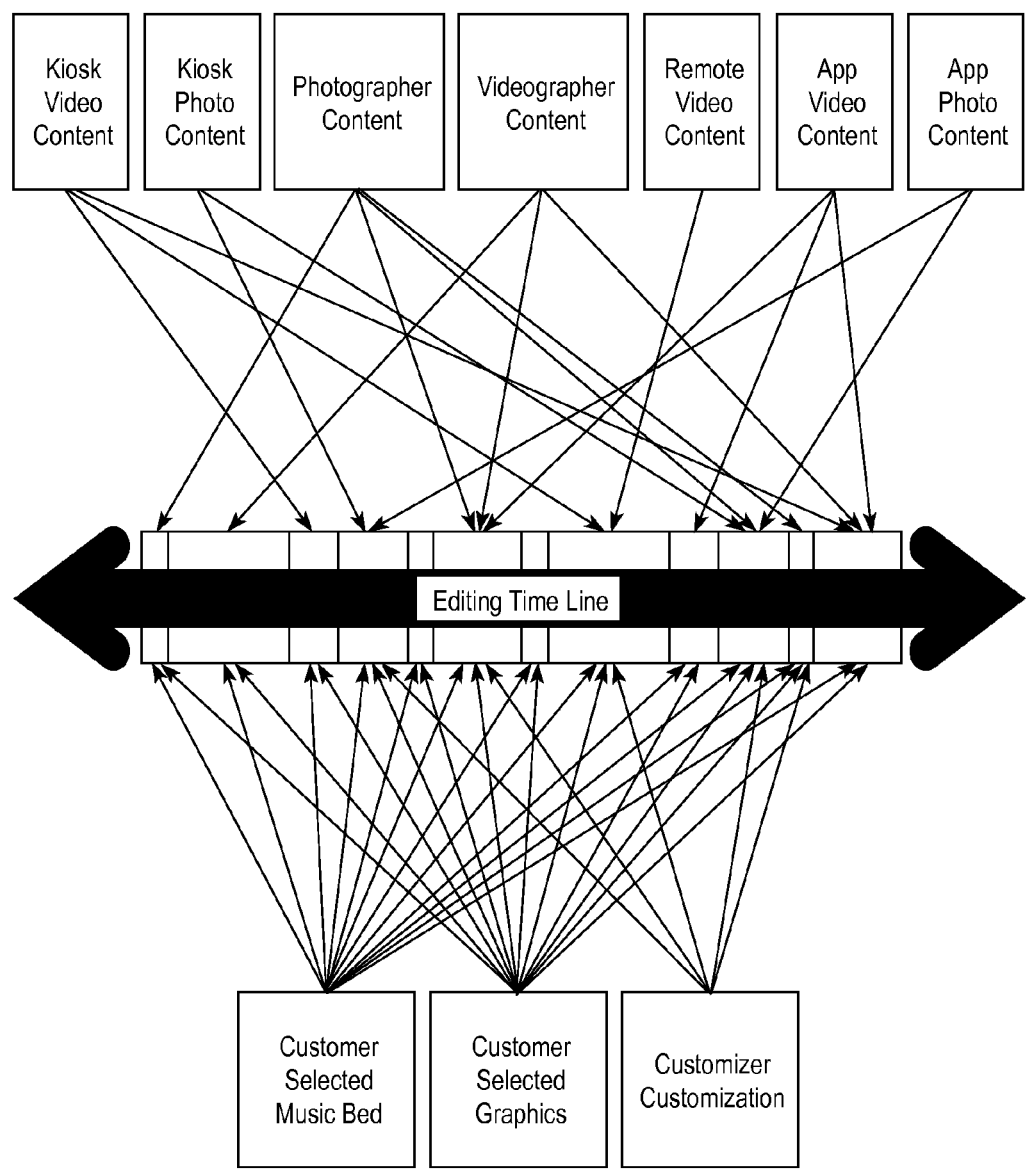
FIG. 8 is a block diagram showing how content from a multiplicity of different points of view is utilized in the production of the event videos according to one embodiment of the invention.

Event images (video and still) produced using the system described herein can be an assembly of content, from a multiplicity of sources to create a documentary of the event that is stylistically unique and more entertaining than the current best practice in this market/application. FIG. 8 graphically depicts this concept as an example of how this content can be combined and seamlessly edited to form one video that captures all content from a multiplicity of different points of view. Specifically:

Video footage from videographer(s) who film entire event (in the case of a wedding, both the ceremony and reception).

Photos from photographer(s) who film entire event (in the case of a wedding, both the ceremony and reception).

Video (e.g., testimonials) from kiosk

Photos (e.g., portraits or "photo-booth" style images) from the kiosk

Video from remote cameras

Video from all attendees using app

Photos from all attendees using app

Video/photos uploaded from offline sources (e.g., cameras) via internet

Video (e.g., testimonials) uploaded via internet (e.g., from parties who are unable to attend event)

Karaoke video footage from kiosk

Dance floor video footage from kiosk

The uniqueness of the captured content is a direct consequence of a number of factors, including the ease of use and anonymous environment created by kiosk 12, which permits users to lose ordinary inhibitions and display their creativity and innermost feelings. Creating this unique content is often a multi-step process. Some activities that enhance uniqueness can include:

a) Pre-Event:
  Advance communications, sent to all potential attendees can be designed to:
    i. Announce the presence of the kiosk
    ii. Prepare attendees for recording messages by allowing them to conceive of ideas prior to arriving at event.
    iii. Send email (or tweet, facebook, instagram, etc. by client preference) text 4 to 5 days prior to event. Text assists and spurs creativity of attendees to conceive special, sentimental, heartfelt, sincere, fun, funny and unique messages.
    iv. Provide clients/attendees with link to download PN-App—which enhances the video-making process. Anyone of the client's choosing may participate by capturing photos and videos via their own Smartphone, computers, cameras, or other digital devices. Those people can become part of client's app community and provide unique content over the internet which can then be part of the final video. This process enables all participants to become a part of the moviemaking process and contributes to unique style of finished video.
    v. Invited individuals who are unable to attend event, may also participate in the moviemaking process by contributing content via the app or via social networking channels, and can watch scenes from the event on a designated website.

b) At-Event:
  The following protocol maximizes the quantity and quality of content:
    i. Videographer records elements of event, as is traditionally done.
    ii. Kiosk is mobile and thus is placed at various locations throughout event. Such locating is designed to achieve these and other objectives:
      a. Maximize frequency of use by attendees (number of recordings) by placing kiosk where there exists a high level of activity (i.e., take the kiosk "to the people").
      b. Optimize visual imagery of event as a background to each recording.
      c. Optimize lighting and ideal visual circumstances for recording.
      d. Provide optimal audio recording conditions so all recordings are audible.
      e. Create some degree of privacy in order to reduce any feelings of inhibitions by attendees.
      f. Create and maximize the unique recording opportunities of attendees while they are engaged in "partying" on the dance floor, coordinate segment with DJ or band, provide props (e.g., microphones, imitation musical instruments), and the display of song lyrics on touch screen.
      g. Create and maximize unique recording opportunities as attendees depart event reflecting upon their cherished experiences of the event and their special relationships with the guests of honor.
    iii. Kiosk set up/environment
      a. Kiosk appearance
      b. Carpeting for visual effect / user location.
      c. Sign with recording ideas in order to further assist those attendees which may require further preparation.
      d. Trained person (producer/attendant) to coach, assist and encourage attendees in the recording process.
      e. Visual image of the guests of honor displayed on the kiosk together with simple, easy-to-use instructions are displayed on the screen for each step of the recording process.
      f. The producer provides for an inviting, easy, welcoming atmosphere which is conducive and optimal for eliciting uninhibited, intimate, highly personal, special, unique, fun, funny, customized thoughts.
      g. During any cocktail hour, many curious guests may explore the kiosk set up, at which time a trained producer can explain functionality and purpose in order to engage guests about service and to reveal ease of process in order to induce attendees to return and record throughout the event.
      h. During this "quieter" period of event, senior citizens can be encouraged to record messages before louder music creates any deterrent.
      i. Producer can make extra effort to secure recordings (multiple recordings from each whenever possible) from all key members of event (bride and groom, parents, siblings, grandparents, children, bridesmaids and groomsmen including best man and maid/matron of honor).
      j. Bride and groom can be solicited to record private and personal message to each other, while they are asked to record "their story" together (how they met, history of courtship, engagement, etc). Kiosk environment can be ideal for providing this very private, personal, and intimate recording thus enabling them to open up and provide a rare and highly valued recording.

Video Production System

A internet-based video/photo editing suite that is template based to simplify the editing process by defining the content to be included in a menu format can be used. This process establishes protocols for editing/formatting which insures quality and consistency of the finished product. One process for editing is outlined below:

a. Client may participate in post-production process via internet by selecting graphic design options, various customized and/or semi customized graphic options (e.g., adding animated comments to kiosk recorded messages).
  b. Client may share kiosk recorded messages and other elements, with others via social networks (e.g., Facebook, Instagram, Twitter, Snapchat, Texting, Email, etc).
  c. Producer views every kiosk-recorded element.
  d. Producer notes beginning and end point for each element.

e. Producer indicates most important and most entertaining elements.
f. Producer identifies dance floor singing elements and provides time codes for "cutting" them into multiple segments to allow for significant distribution throughout the post-dinner sections of finished video.
g. Producer indicates where to places each of those important/entertaining elements and disperses them somewhat evenly through the ordering of all the kiosk recorded elements.
h. Secure videographers' footage of event.
i. Editor creates video pods of each major and important event (ceremony, toasts, cake cutting, first dance, bouquet/garter toss).
j. Obtain client selected photos from day of event images, and more. May source from photographers, clients' historical photos, attendees'.
k. Smartphone and digital devices photos and videos. Photos are provided by client via internet interface.
l. Producer constructs format (ordering) which integrates all major elements: video footage from videographer, kiosk recorded messages, kiosk singing segments, photos (and other videos)
m. Editor follows format to build video.
n. Editor adds computer graphics (chosen by client from a variety of designs), to adorn/enhance all kiosk recordings, photos, and transitional elements(used when moving from one segment to another of a different type—i.e. from video segment transition to photo segment transition to kiosk recordings segment, etc). Creates a highly professional, broadcast quality "packaging" (presentation) of video.
o. Editor adds music sound track and/or enhances natural (original) sound of video segments and photo segment
p. Editor adds semi custom opening and closing segments by inserting images of guests of honor, names, and dates.
q. Finished video burned, labeled, packaged, and delivered on DVD and/or BluRay in addition to online posting for client distribution via the internet.

Interactive Editing Suite

In one embodiment, the internet-based video/photo editing suite can include the capacity to permit the client to login to the suite and view all video and photos recorded during the event. The client can be given the ability to title/caption each photo/video and select which are incorporated into the finished event video production. Software and other tools for this purpose are readily available or can be created. Companies that offer this service include Picfont, Ribbet, and Fotor, as just a few examples. Microsoft Powerpoint, Apple Keynote, iMovie, Final Cut, Avid and Wondershare Video Editor can also be used for this purpose, as can Adobe Illustrator and Photoshop. iPhone apps, such as Pictures with Words Pro, can also be used for this purpose.

What is claimed is:

1. A recording and entertainment system comprising:
a mobile kiosk unit, wherein the entire unit moves relative to a user, the mobile kiosk unit comprising a wheeled base, a support secured to said wheeled base, and a head secured to said support,
a camera housed within said head, the camera for capturing visual content while said mobile kiosk unit is moving or stationary,
an audio recording system on said mobile kiosk unit, the audio recording system for recording audio content while said mobile kiosk unit is moving or stationary,
a computer on said mobile kiosk unit, the computer for running user interface software and controlling the recording, storage, processing and playing of said visual content and said audio content independently or together,
robotic drive means on said mobile kiosk unit,
a kiosk motion remote controller that communicates with said robotic drive means to move said mobile kiosk unit as an entire unit,
a display device for displaying output from said computer, and
means for recognizing music emanating from a source other than said mobile kiosk unit and displaying lyrics synchronized to said music on said display device.

2. A recording and entertainment system comprising:
a mobile kiosk unit, wherein the entire unit moves relative to a user, the mobile kiosk unit comprising a wheeled base, a support secured to said base, and a head secured to said support,
a camera housed within said head, the camera for capturing visual content while said mobile kiosk unit is moving or stationary,
and audio recording system on said mobile kiosk unit, the audio recording system for recording audio content while said mobile kiosk unit is moving or stationary,
a computer on said mobile kiosk unit, the computer for running user interface software and controlling the recording, storage, processing and playing of said visual content and said audio content independently or together,
robotic drive means on said mobile kiosk unit,
a kiosk motion remote controller that communicates with said robotic drive means to move said mobile kiosk unit as an entire unit,
a display device for displaying output from said computer,
means for recognizing music emanating from a source other than said mobile kiosk unit and displaying lyrics synchronized to said music on said display device, and
means for tilting or panning said camera.

3. A recording and entertainment system comprising:
a mobile kiosk unit, wherein the entire unit moves relative to a user, the mobile kiosk unit comprising a wheeled base, a support secured to said wheeled base, and a head secured to said support,
a camera housed within said head, the camera for capturing visual content while said mobile kiosk unit is moving or stationary,
an audio recording system on said mobile kiosk unit, the audio recording system for recording audio content while said mobile kiosk unit is moving or stationary,
a computer on said mobile kiosk unit, the computer for running user interface software and controlling the recording, storage, processing and playing of said visual content and said audio content independently or together,
robotic drive means on said mobile kiosk unit,
a kiosk motion remote controller that communicates with said robotic drive means to move said mobile kiosk unit as an entire unit,
a display device for displaying output from said computer,
means for recognizing music emanating from a source other than said mobile kiosk unit and displaying lyrics synchronized to said music on said display device, and
means for audio noise suppression.

4. A recording and entertainment system comprising:
a mobile kiosk unit, wherein the entire unit moves relative to a user, the mobile kiosk unit comprising a wheeled base, a support secured to said wheeled base, and a head secured to said support,
a camera housed within said head, the camera for capturing visual content while said mobile kiosk unit is moving or stationary,
an audio recording system on said mobile kiosk unit, the audio recording system for recording audio content while said mobile kiosk unit is moving or stationary,
a computer on said mobile kiosk unit, the computer for running user interface software and controlling the recording, storage, processing and playing of said visual content and said audio content independently or together,
robotic drive means on said mobile kiosk unit,
a kiosk motion remote controller that communicates with said robotic drive means to move said mobile kiosk unit as an entire unit,
a display device for displaying output from said computer,
means for recognizing music emanating from a source other than said mobile kiosk unit and displaying lyrics synchronized to said music on said display device, and
means for audio noise cancelation.

5. A recording and entertainment system comprising:
a mobile kiosk unit, wherein the entire unit moves relative to a user, the mobile kiosk unit comprising a wheeled base, a support secured to said wheeled base, and a head secured to said support,
a camera housed within said head, the camera for capturing visual content while said mobile kiosk unit is moving or stationary,
an audio recording system on said mobile kiosk unit, the audio recording system for recording audio content while said mobile kiosk unit is moving or stationary,
a computer on said mobile kiosk unit, the computer for running user interface software and controlling the recording, storage, processing and playing of said visual content and said audio content independently or together,
robotic drive means on said mobile kiosk unit,
a kiosk motion remote controller that communicates with said robotic drive means to move said mobile kiosk unit as an entire unit,
a display device for displaying output from said computer,
means for recognizing music emanating from a source other than said mobile kiosk unit and displaying lyrics synchronized to said music on said display device, and
means for voice control of said computer.

6. A recording and entertainment system comprising:
a mobile kiosk unit, wherein the entire unit moves relative to a user, the mobile kiosk unit comprising a wheeled base, a support secured to said wheeled base, and a head secured to said support,
a camera housed within said head, the camera for capturing visual content while said mobile kiosk unit is moving or stationary,
an audio recording system on said mobile kiosk unit, the audio recording system for recording audio content while said mobile kiosk unit is moving or stationary,
a computer on said mobile kiosk unit, the computer for running user interface software and controlling the recording, storage, processing and playing of said visual content and said audio content independently or together,
robotic drive means on said mobile kiosk unit,
a kiosk motion remote controller that communicates with said robotic drive means to move said mobile kiosk unit as an entire unit,
a device for displaying output from said computer,
means for recognizing music emanating from a source other than said mobile kiosk unit and displaying lyrics synchronized to said music on said display device, and
a battery powering said mobile kiosk unit.

7. A recording and entertainment system comprising:
a mobile kiosk unit, wherein the entire unit moves relative to a user, the mobile kiosk unit comprising a wheeled base, a support secured to said wheeled base, and a head secured to said support,
a camera housed within said head, the camera for capturing visual content while said mobile kiosk unit is moving or stationary,
an audio recording system on said mobile kiosk unit, the audio recording system for recording audio content while said mobile kiosk unit is moving or stationary,
a computer on said mobile kiosk unit, the computer for running user interface software and controlling the recording, storage, processing and playing of said visual content and said audio content independently or together,
robotic drive means on said mobile kiosk unit,
a kiosk motion remote controller that communicates with said robotic drive means to move said mobile kiosk unit as an entire unit,
a display device for displaying output from said computer,
means for recognizing music emanating from a source other than said mobile kiosk unit and displaying lyrics synchronized to said music on said display device, and
a means for internet communication of said visual or audio content or both.

8. A recording and entertainment system comprising:
a mobile kiosk unit, wherein the entire unit moves relative to a user, the mobile kiosk unit comprising a wheeled base, a support secured to said wheeled base, and a head secured to said support,
a camera housed within said head, the camera for capturing visual content while said mobile kiosk unit is moving or stationary,
an audio recording system on said mobile kiosk unit, the audio recording system for recording audio content while said mobile kiosk unit is moving or stationary,
a computer on said mobile kiosk unit, the computer for running user interface software and controlling the recording, storage, processing and playing of said visual content and said audio content independently or together,
robotic drive means on said mobile kiosk unit,
a kiosk motion remote controller that communicates with said robotic drive means to move said mobile kiosk unit as an entire unit,
a display device for displaying output from said computer,
means for recognizing music emanating from a source other than said mobile kiosk unit and displaying lyrics synchronized to said music on said display device, and
face tracking software to center a field of view of said camera on one or more individuals to be recorded.

9. A recording and entertainment system comprising:
a mobile kiosk unit, wherein the entire unit moves relative to a user, the mobile kiosk unit comprising a wheeled base, a support secured to said wheeled base, and a head secured to said support,
a camera housed within said head, the camera for capturing visual content while said mobile kiosk unit is moving or stationary, an audio recording system on said mobile kiosk unit, the audio recording system for recording audio content while said mobile kiosk unit is moving or stationary, a computer on said mobile kiosk unit, the computer for running user interface software and controlling the recording, storage, processing and playing of said visual content and said audio content independently or together, robotic drive means on said mobile kiosk unit, a kiosk motion remote controller that communicates with said robotic drive means to move said mobile kiosk unit as an entire unit, a display device for displaying output from said computer, means for recognizing music emanating from a source other than said mobile kiosk unit and displaying lyrics synchronized to said music on said display device, and means for confirming objects of visual content capture are within a field of view of the camera.

10. A recording and entertainment system comprising:

a mobile kiosk unit, wherein the entire unit moves relative to a user, the mobile kiosk unit comprising a wheeled base, a support secured to said wheeled base, and a head secured to said support, a camera housed within said head, the camera for capturing visual content while said mobile kiosk unit is moving or stationary, an audio recording system on said mobile kiosk unit, the audio recording system for recording audio content while said mobile kiosk unit is moving or stationary, a computer on said mobile kiosk unit, the computer for running user interface software and controlling the recording, storage, processing and playing of said visual content and said audio content independently or together, robotic drive means on said mobile kiosk unit, a kiosk motion remote controller that communicates with said robotic drive means to move said mobile kiosk unit as an entire unit, a display device for displaying output from said computer, and means for recognizing music emanating from a source other than said mobile kiosk unit and displaying lyrics synchronized to said music on said display device.

11. A recording and entertainment system comprising:

a mobile kiosk unit, wherein the entire unit moves relative to a user, the mobile kiosk unit comprising a wheeled base, a support secured to said wheeled base, and a head secured to said support, a camera housed within said head, the camera for capturing visual content while said mobile kiosk unit is moving or stationary, an audio recording system on said mobile kiosk unit, the audio recording system for recording audio content while said mobile kiosk unit is moving or stationary, one or more sensors for detecting users and objects near said mobile kiosk unit, a computer on said mobile kiosk unit, the computer for running user interface software and controlling the recording, storage, processing and playing of said visual content and said audio content independently or together, and for receiving user input from said user interface software, running preprogrammed routing programs or receiving data from any combination of said one or more sensors to generate and communicate Input/Output instructions, robotic drive means on said mobile kiosk unit for receiving said Input/Output instructions from said computer to move said mobile kiosk unit, as an entire unit, according to said user input, along a preprogrammed route or to self-navigate around obstacles in response to said Input/Output instructions, a display device for displaying output from said computer, and means for recognizing music emanating from a source other than said mobile kiosk unit and displaying lyrics synchronized to said music on said display device.

12. A recording and entertainment system comprising:

a mobile kiosk unit, wherein the entire unit moves relative to a user, the mobile kiosk unit comprising a wheeled base, a support secured to said wheeled base, and a head secured to said support, a camera housed within said head, the camera for capturing visual content while said mobile kiosk unit is moving or stationary, an audio recording system on said mobile kiosk unit, the audio recording system for recording audio content while said mobile kiosk unit is moving or stationary, a computer on said mobile kiosk unit, the computer for running user interface software and controlling the recording, storage, processing and playing of said visual content and said audio content independently or together, robotic drive means on said mobile kiosk unit, a kiosk motion remote controller that communicates with said robotic drive means to move said mobile kiosk unit as an entire unit, a display device for displaying output from said computer, means for recognizing music emanating from a source other than said mobile kiosk unit and displaying lyrics synchronized to said music on said display device, and interactive gaming means.

13. A recording and entertainment system comprising:

a collapsible mobile kiosk unit, wherein the entire unit moves relative to a user, the collapsible mobile kiosk unit comprising a wheeled base, a support secured to said wheeled base, and a head secured to said support, a pneumatic assist device for opening said collapsible mobile kiosk unit to a deployed position, a camera housed within said head, the camera for capturing visual content while said collapsible mobile kiosk unit is moving or stationary, an audio recording system on said collapsible mobile kiosk unit, the audio recording system for recording audio content while said collapsible mobile kiosk unit is moving or stationary, a computer on said collapsible mobile kiosk unit, the computer for running user interface software and controlling the recording, storage, processing and playing of said visual content and said audio content independently or together, robotic drive means on said collapsible mobile kiosk unit, a kiosk motion remote controller that communicates with said robotic drive means to move said collapsible mobile kiosk unit as an entire unit, and a display device for displaying output from said computer.

* * * * *